(12) United States Patent
Zheng et al.

(10) Patent No.: US 12,255,819 B2
(45) Date of Patent: Mar. 18, 2025

(54) TRANSMISSION PIPE CONFIGURATION METHOD, APPARATUS, AND SYSTEM

(71) Applicant: Huawei Technologies Co., Ltd., Shenzhen (CN)

(72) Inventors: Yu Zheng, Dongguan (CN); Wei Chen, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 17/891,454

(22) Filed: Aug. 19, 2022

(65) Prior Publication Data

US 2022/0393980 A1  Dec. 8, 2022

Related U.S. Application Data

(63) Continuation of application No. PCT/CN2020/137268, filed on Dec. 17, 2020.

(30) Foreign Application Priority Data

Feb. 20, 2020  (CN) .......................... 202010106844.X

(51) Int. Cl.
*H04L 45/745* (2022.01)
*H04B 10/27* (2013.01)
*H04L 45/50* (2022.01)

(52) U.S. Cl.
CPC ........... *H04L 45/745* (2013.01); *H04B 10/27* (2013.01); *H04L 45/50* (2013.01)

(58) Field of Classification Search
CPC ....... H04L 45/745; H04L 45/50; H04L 45/02; H04L 45/04; H04L 45/64; H04J 3/1652; H04Q 11/0005
See application file for complete search history.

(56) References Cited

U.S. PATENT DOCUMENTS 8,565,597 B2  10/2013  Zheng
9,071,666 B2  6/2015  Sridhar et al.
9,467,376 B2  10/2016  Shuai
(Continued)

FOREIGN PATENT DOCUMENTS

CN  101663862 A  3/2010
CN  101729384 A  6/2010
(Continued)

*Primary Examiner* — Caroline H Jahnige
(74) *Attorney, Agent, or Firm* — SLATER MATSIL, LLP

(57) ABSTRACT

A transmission pipe configuration method, including receiving a device address of a first network domain, a device address of a second network domain from, generating an identifier of a transmission pipe based on the device address of the first network domain and the device address of the second network domain, where the transmission pipe connects a first border transport device and a second border transport device, and sending to the first border transport device, the identifier of the transmission pipe and the device address that is of the second network domain and that corresponds to the transmission pipe. The identifier of the transmission pipe and the device address are used to generate a forwarding table of the first border transport device, the forwarding table indicating a forwarding relationship where service data is forwarded from the first network domain to the second network domain using the transmission pipe.

20 Claims, 12 Drawing Sheets

(56) References Cited

U.S. PATENT DOCUMENTS

| | | | |
|---|---|---|---|
| 9,602,461 B2 | 3/2017 | Huang et al. | |
| 11,528,225 B2 | 12/2022 | Zhou et al. | |
| 2012/0301134 A1 | 11/2012 | Davari et al. | |
| 2015/0341259 A1* | 11/2015 | Li | H04L 45/50 370/392 |
| 2019/0190746 A1* | 6/2019 | Lee | H04L 47/20 |
| 2019/0313167 A1* | 10/2019 | Lee | H04L 41/5051 |

FOREIGN PATENT DOCUMENTS

| | | |
|---|---|---|
| CN | 102316028 A | 1/2012 |
| CN | 103024852 A | 4/2013 |
| CN | 104618150 A | 5/2015 |
| CN | 109495369 A | 3/2019 |
| CN | 110324246 A | 10/2019 |

\* cited by examiner

| Device address of a first network domain | Device address of a second network domain | Identifier of a first transmission pipe |
|---|---|---|
| MAC address of a first border device 1 | MAC address of a second border device 1 | 1001 |
| MAC address of the first border device 1 | MAC address of a second border device 2 | 1002 |
| MAC address of a first border device 2 | MAC address of the second border device 1 | 1003 |
| MAC address of the first border device 2 | MAC address of the second border device 2 | 1004 |

FIG. 4

| Device address of a second network domain | Identifier of a first transmission pipe |
|---|---|
| MAC of a second border device 1 | 1001 |
| MAC of a second border device 2 | 1002 |

Forwarding table of a first border transport device 1

| Device address of the second network domain | Identifier of the first transmission pipe |
|---|---|
| MAC of the second border device 1 | 1003 |
| MAC of the second border device 2 | 1004 |

Forwarding table of a first border transport device 2

FIG. 5a

| Device address of a first network domain | Identifier of a first transmission pipe |
|---|---|
| MAC address of a first border device 1 | 1001 |
| MAC address of a first border device 2 | 1003 |

Forwarding table of a second border transport device 1

| Device address of the first network domain | Identifier of the first transmission pipe |
|---|---|
| MAC address of the first border device 1 | 1002 |
| MAC address of the first border device 2 | 1004 |

Forwarding table of a second border transport device 2

FIG. 5b

| Destination address of a first network domain | Device address of the first network domain | Device address of a second network domain | Identifier of a first transmission pipe |
|---|---|---|---|
| IP address of a first device 1 | MAC address of a first border device 1 | MAC of a second border device 1 | 2001 |
| IP address of the first device 1 | MAC address of the first border device 1 | MAC of a second border device 2 | 2002 |
| IP address of a first device 2 | MAC address of the first border device 1 | MAC of the second border device 1 | 2003 |
| IP address of the first device 2 | MAC address of the first border device 1 | MAC of the second border device 2 | 2004 |
| IP address of a first device 3 | MAC address of a first border device 2 | MAC of the second border device 1 | 2005 |
| IP address of the first device 3 | MAC address of the first border device 2 | MAC of the second border device 2 | 2006 |

FIG. 7

| Destination address of a first network domain | Device address of the first network domain | Identifier of a first transmission pipe | Destination address of the first network domain | Device address of the first network domain | Identifier of the first transmission pipe |
|---|---|---|---|---|---|
| IP address of a first device 1 | MAC address of a first border device 1 | 2001 | IP address of the first device 1 | MAC address of the first border device 1 | 2002 |
| IP address of a first device 2 | MAC address of the first border device 1 | 2003 | IP address of the first device 2 | MAC address of the first border device 1 | 2004 |
| IP address of a first device 3 | MAC address of a first border device 2 | 2005 | IP address of the first device 3 | MAC address of the first border device 2 | 2006 |

Forwarding table of a second border transport device 1

Forwarding table of a second border transport device 2

FIG. 8

TRANSMISSION PIPE CONFIGURATION METHOD, APPARATUS, AND SYSTEM

CROSS-REFERENCE TO RELATED APPLICATIONS

This application is a continuation of International Application No. PCT/CN2020/137268, filed on Dec. 17, 2020, which claims priority to Chinese Patent Application No. 202010106844.X, filed on Feb. 20, 2020. The disclosures of the aforementioned applications are hereby incorporated by reference in their entireties.

TECHNICAL FIELD

The present invention relates to the field of communications technologies, and in particular, to a transmission pipe configuration method, an apparatus, and a system.

BACKGROUND

With rapid development of communications technologies, services such as a virtual reality (VR) game and an ultra-definition video are widely used. Different service data has different transmission requirements, for example, has different bandwidth and delay requirements. To meet transmission requirements of different service data, in a communications system using an optical transport network (OTN), different service data may be transmitted to a peer end by using different transmission pipes. Different transmission pipes correspond to different bandwidths and delays. Different service data is transmitted by using different transmission pipes, to implement bandwidth isolation and delay stability, thereby meeting a user requirement.

In an existing communications system using the OTN, a transmission pipe may include a multi-protocol label switching (MPLS) tunnel or an OTN pipe. The MPLS tunnel may correspond to an address of an optical network terminal (ONT) and an address of an application server, to transmit service data between the ONT and the application server. The OTN pipe may correspond to the address of the ONT and the address of the application server, to transmit service data between the ONT and the application server. The OTN pipe may also correspond to an address of an optical line terminal (OLT) and an address of a router, to transmit service data between the OLT and the router. For example, FIG. 1b is a schematic diagram of a communications system using an OTN. In the communications system, a transmission pipe between an ONT 1 and an application server 1 may be an MPLS tunnel corresponding to an address of the ONT 1 and an address of the application server 1, may be an OTN pipe corresponding to an address of the ONT and an address of an application server, or may be an OTN pipe corresponding to an address of an OLT and an address of a router.

Through comparison between the MPLS tunnel and the OTN pipe, it may be found that, compared with the MPLS tunnel or the OTN pipe that establishes a correspondence with the address of the ONT and the address of the application server, the OTN pipe that establishes a correspondence with the address of the OLT and the address of the router may not need to correspond to the ONT and/or the application server, thereby facilitating establishment of a transmission pipe. Currently, the OTN pipe corresponding to the address of the OLT and the address of the router is preferably established.

A manual static configuration manner may be currently used to establish the OTN pipe corresponding to the address of the OLT and the address of the router. The manner includes the following, including addresses of an OLT and a router that exist in a communications system using the OTN is manually determined. The address of the OLT and the address of the router are configured into a central control unit (CCU) in the OTN in the manual static configuration manner. The CCU determines at least one OTN pipe based on the address of the OLT and the address of the router, where one end of each pipe is an access OTN device, and the other end is a core OTN device, and sends, to a corresponding access OTN device and a core OTN device, an address of an OLT and an address of a router that correspond to each OTN pipe.

However, a quantity of OLTs is huge in the existing communications system using the OTN. Because the CCU cannot learn of addresses of an OLT and a router that exist in the communications system, when the foregoing manual static configuration manner is used, working difficulty in initially collecting the address of the OLT and the address of the router is increased, which is not helpful in establishment the OTN pipe.

SUMMARY

In view of this, the present invention aims to provide a transmission pipe configuration method, an apparatus, and a system, to resolve a technical problem that when a manual static configuration manner is used in an existing communications system using an OTN, working difficulty in initially collecting an address of an OLT and an address of a router is increased, which is not helpful in establishing an OTN pipe.

To achieve the foregoing objectives, the following technical solutions are used in embodiments of this application.

According to a first aspect, an embodiment of the present invention provides a transmission pipe configuration method. The method is applied to a controller. The controller is configured to centrally control a transport network that includes a first border transport device and a second border transport device, and the transport network is configured to connect a first network domain and a second network domain. The first network domain includes a first border device, the second network domain includes a second border device, the first border transport device is connected to the first border device, and the second border transport device is connected to the second border device. The method includes the controller receives a device address of the first network domain from the first border transport device, and receives a device address of the second network domain from the second border transport device, and generates an identifier of a transmission pipe based on the device address of the first network domain and the device address of the second network domain, where the transmission pipe is used to connect the first border transport device and the second border transport device. The controller sends, to the first border transport device, the identifier of the transmission pipe and the device address that is of the second network domain and that corresponds to the transmission pipe, where the identifier of the transmission pipe and the device address that is of the second network domain and that corresponds to the transmission pipe are used to generate a forwarding table that is of the first border transport device and that is used to indicate a forwarding relationship in which service data is forwarded from the device address of the first network domain to the device address of the second network domain by using the transmission pipe.

Based on the method in the first aspect, the controller may receive the device address of the first network domain and the device address of the second network domain by using the first border transport device and the second border transport device without manual static configuration, thereby reducing working difficulty in initially collecting the device address of the first network domain and the device address of the second network domain. In addition, the controller may directly generate the identifier of the transmission pipe based on the received device address of the first network domain and the received device address of the second network domain, to facilitate establishment of the transmission pipe. Moreover, the controller sends, to the first border transport device, the identifier of the transmission pipe and the device address that is of the second network domain and that corresponds to the transmission pipe, so that the first border transport device generates a corresponding forwarding table, and the first border transport device subsequently forwards, to the second network domain based on the forwarding table, service data from the device address of the first network domain by using the transmission pipe corresponding to the device address of the second network domain.

In a possible design, with reference to the first aspect, the controller sends, to the second border transport device, the identifier of the transmission pipe and the device address that is of the first network domain and that corresponds to the transmission pipe, where the identifier of the transmission pipe and the device address that is of the first network domain and that corresponds to the transmission pipe are used to generate a forwarding table that is of the second border transport device and that is used to indicate a forwarding relationship in which service data is forwarded from the device address of the second network domain to the device address of the first network domain by using the transmission pipe.

Based on the possible design, the controller sends, to the second border transport device, the identifier of the transmission pipe and the device address that is of the first network domain and that corresponds to the transmission pipe, so that the second border transport device generates a corresponding forwarding table, and the second border transport device subsequently forwards, to the first network domain based on the forwarding table, service data from the device address of the second network domain by using the transmission pipe corresponding to the device address of the first network domain.

In a possible design, with reference to the first aspect or the possible design of the first aspect, the device address of the first network domain may include an address of the first border device and/or a destination address of the first network domain. For example, the device address of the first network domain includes the address of the first border device, or the device address of the first network domain includes the address of the first border device and the destination address of the first network domain.

In a possible design, with reference to the first aspect or the possible design of the first aspect, the device address of the second network domain may include an address of the second border device and/or a destination address of the second network domain. For example, the device address of the second network domain includes the address of the second border device, or the device address of the second network domain includes the address of the second border device and the destination address of the second network domain.

Based on the possible design, when the device address of the first network domain includes the address of the first border device and the device address of the second network domain includes the address of the second border device, the controller may generate a transmission pipe corresponding to the address of the first border device and the address of the second border device, so that the first border device forwards service data to the second border device by using the transmission pipe corresponding to the first border device. Alternatively, when the device address of the first network domain includes the address of the first border device and the destination address of the first network domain and the device address of the second network domain includes the address of the second border device, the controller may generate a transmission pipe corresponding to the destination address of the first network domain and the address of the second border device, so that the first border device forwards, to the second border device, received service data from the destination address of the first network domain by using the transmission pipe corresponding to the destination address of the first network domain.

In a possible design, with reference to the first aspect or the possible design of the first aspect, the controller communicates with the first border transport device based on a control plane protocol message.

In a possible design, with reference to the first aspect or the possible design of the first aspect, the controller communicates with the second border transport device based on a control plane protocol message.

Based on the foregoing two possible designs, the controller may communicate with the first border transport device and the second border transport device based on a control plane protocol, so that control plane reachability is implemented and there is no need to occupy a large quantity of data bandwidth resources, thereby saving network resources on a data plane.

In a possible design, with reference to the first aspect or the possible design of the first aspect, the controller receives device addresses of second network domains from a plurality of second border transport devices in the transport network, and sends, to the first border transport device based on a same control plane protocol message, the device addresses that are of the second network domains and that are from the plurality of second border transport devices and an identifier of a transmission pipe corresponding to the device address of each second network domain.

Based on the possible design, the controller may send, to the first border transport device based on the same control plane protocol message, the device addresses that are of the second network domains and that are from the plurality of second border transport devices and the identifier of the transmission pipe corresponding to the device address of each second network domain, to reduce signaling interaction.

In a possible design, with reference to the first aspect or the possible design of the first aspect, the controller receives device addresses of first network domains from a plurality of first border transport devices in the transport network, and sends, to the second border transport device based on a same control plane protocol message, the device addresses that are of the first network domains and that are from the plurality of first border transport devices and an identifier of a transmission pipe corresponding to the device address of each first network domain.

Based on the possible design, the controller may send, to the second border transport device based on the same control plane protocol message, the device addresses that are of the first network domains and that are from the plurality of first border transport devices and the identifier of the transmission pipe corresponding to the device address of each first network domain, to reduce signaling interaction.

In a possible design, with reference to the first aspect or the possible design of the first aspect, the transmission pipe includes one of an optical layer pipe, an electrical layer pipe, or a multi-protocol label switching (MPLS) tunnel.

Based on the possible design, the transmission pipe in this embodiment of this application may be the optical layer pipe, the electrical layer pipe, or the MPLS tunnel, which is not limited, thereby increasing diversification of the transmission pipe.

In a possible design, with reference to the first aspect or the possible design of the first aspect, the device address of the first network domain includes an Internet Protocol (IP) address and/or a media access control (MAC) address. For example, the device address of the first network domain includes the address of the first border device and/or the destination address of the first network domain, the address of the first border device includes a MAC address, and the destination address of the first network domain includes an IP address.

In a possible design, with reference to the first aspect or the possible design of the first aspect, the device address of the second network domain includes an IP address and/or a MAC address. For example, the device address of the second network domain includes the address of the second border device and/or the destination address of the second network domain, the address of the second border device includes a MAC address, and the destination address of the second network domain includes an IP address.

In a possible design, with reference to the first aspect or the possible design of the first aspect, the first network domain is a user-side network domain, and the second network domain is a server-side network domain, or the first network domain is a server-side network domain, and the second network domain is a user-side network domain.

Based on the possible design, the first network domain may be a user-side network domain, and the second network domain may be a server-side network domain, or the first network domain may be a server-side network domain, and the second network domain may be a user-side network domain, which is not limited. In other words, a user-side network domain may implement the method in this embodiment or a server-side network domain may implement the method in this embodiment, thereby improving flexibility of method implementation.

According to a second aspect, a communications apparatus is provided. The communications apparatus may implement functions performed by the controller in the first aspect or the design of the first aspect, and the functions may be implemented by executing corresponding software by using hardware. The hardware or the software includes one or more modules corresponding to the functions. For example, the communications apparatus includes a receiving module, a processing module, and a sending module.

The receiving module is configured to receive a device address of a first network domain from a first border transport device.

The receiving module is further configured to receive a device address of a second network domain from a second border transport device.

The processing module is configured to generate an identifier of a transmission pipe based on the device address of the first network domain and the device address of the second network domain, where the transmission pipe is used to connect the first border transport device and the second border transport device.

The sending module is configured to send, to the first border transport device, the identifier of the transmission pipe and the device address that is of the second network domain and that corresponds to the transmission pipe, where the identifier of the transmission pipe and the device address that is of the second network domain and that corresponds to the transmission pipe are used to generate a forwarding table that is of the first border transport device and that is used to indicate a forwarding relationship in which service data is forwarded from the device address of the first network domain to the device address of the second network domain by using the transmission pipe.

For a specific implementation of the communications apparatus, refer to a behavior function in the transmission pipe configuration method provided in the first aspect or any possible design of the first aspect. Based on the communications apparatus in the second aspect, the controller may receive the device address of the first network domain and the device address of the second network domain by using the first border transport device and the second border transport device without manual static configuration, thereby reducing working difficulty in initially collecting the device address of the first network domain and the device address of the second network domain. In addition, the controller may directly generate the identifier of the transmission pipe based on the received device address of the first network domain and the received device address of the second network domain, to facilitate establishment of the transmission pipe. Moreover, the controller sends, to the first border transport device, the identifier of the transmission pipe and the device address that is of the second network domain and that corresponds to the transmission pipe, so that the first border transport device generates a corresponding forwarding table, and the first border transport device subsequently forwards, to the second network domain based on the forwarding table, service data from the device address of the first network domain by using the transmission pipe corresponding to the device address of the second network domain.

In a possible design, with reference to the second aspect, the sending module is further configured to send, to the second border transport device, the identifier of the transmission pipe and the device address that is of the first network domain and that corresponds to the transmission pipe, where the identifier of the transmission pipe and the device address that is of the first network domain and that corresponds to the transmission pipe are used to generate a forwarding table that is of the second border transport device and that is used to indicate a forwarding relationship in which service data is forwarded from the device address of the second network domain to the device address of the first network domain by using the transmission pipe.

Based on the possible design, the controller sends, to the second border transport device, the identifier of the transmission pipe and the device address that is of the first network domain and that corresponds to the transmission pipe, so that the second border transport device generates a corresponding forwarding table, and the second border transport device subsequently forwards, to the first network domain based on the forwarding table, service data from the device address of the second network domain by using the transmission pipe corresponding to the device address of the first network domain.

In a possible design, with reference to the second aspect or the possible design of the second aspect, the device address of the first network domain may include an address of the first border device and/or a destination address of the first network domain. For example, the device address of the first network domain includes the address of the first border device, or the device address of the first network domain includes the address of the first border device and the destination address of the first network domain.

In a possible design, with reference to the second aspect or the possible design of the second aspect, the device address of the second network domain may include an address of the second border device and/or a destination address of the second network domain. For example, the device address of the second network domain includes the address of the second border device, or the device address of the second network domain includes the address of the second border device and the destination address of the second network domain.

Based on the possible design, when the device address of the first network domain includes the address of the first border device and the device address of the second network domain includes the address of the second border device, the controller may generate a transmission pipe corresponding to the address of the first border device and the address of the second border device, so that the first border device forwards service data to the second border device by using the transmission pipe corresponding to the first border device. Alternatively, when the device address of the first network domain includes the address of the first border device and the destination address of the first network domain and the device address of the second network domain includes the address of the second border device, the controller may generate a transmission pipe corresponding to the destination address of the first network domain and the address of the second border device, so that the first border device forwards, to the second border device, received service data from the destination address of the first network domain by using the transmission pipe corresponding to the destination address of the first network domain.

In a possible design, with reference to the second aspect or the possible design of the second aspect, the communications apparatus communicates with the first border transport device based on a control plane protocol message.

In a possible design, with reference to the second aspect or the possible design of the second aspect, the communications apparatus communicates with the second border transport device based on a control plane protocol message.

Based on the foregoing two possible designs, the controller may communicate with the first border transport device and the second border transport device based on a control plane protocol, so that control plane reachability is implemented and there is no need to occupy a large quantity of data bandwidth resources, thereby saving network resources on a data plane.

In a possible design, with reference to the second aspect or the possible design of the second aspect, the receiving module is further configured to receive device addresses of second network domains from a plurality of second border transport devices in a transport network. The sending module is further configured to send, to the first border transport device based on a same control plane protocol message, the device addresses that are of the second network domains and that are from the plurality of second border transport devices and an identifier of a transmission pipe corresponding to the device address of each second network domain.

Based on the possible design, the controller may send, to the first border transport device based on the same control plane protocol message, the device addresses that are of the second network domains and that are from the plurality of second border transport devices and the identifier of the transmission pipe corresponding to the device address of each second network domain, to reduce signaling interaction.

In a possible design, with reference to the second aspect or the possible design of the second aspect, the receiving module is further configured to receive device addresses of first network domains from a plurality of first border transport devices in the transport network. The sending module is further configured to send, to the second border transport device based on a same control plane protocol message, the device addresses that are of the first network domains and that are from the plurality of first border transport devices and an identifier of a transmission pipe corresponding to the device address of each first network domain.

Based on the possible design, the controller may send, to the second border transport device based on the same control plane protocol message, the device addresses that are of the first network domains and that are from the plurality of first border transport devices and the identifier of the transmission pipe corresponding to the device address of each first network domain, to reduce signaling interaction.

In a possible design, with reference to the second aspect or the possible design of the second aspect, the transmission pipe includes one of an optical layer pipe, an electrical layer pipe, or a multi-protocol label switching (MPLS) tunnel.

Based on the possible design, the transmission pipe in this embodiment of this application may be the optical layer pipe, the electrical layer pipe, or the MPLS tunnel, which is not limited, thereby increasing diversification of the transmission pipe.

In a possible design, with reference to the second aspect or the possible design of the second aspect, the device address of the first network domain includes an Internet Protocol (IP) address and/or a media access control (MAC) address. For example, the device address of the first network domain includes the address of the first border device and/or the destination address of the first network domain, the address of the first border device includes a MAC address, and the destination address of the first network domain includes an IP address.

In a possible design, with reference to the second aspect or the possible design of the second aspect, the device address of the second network domain includes an IP address and/or a MAC address. For example, the device address of the second network domain includes the address of the second border device and/or the destination address of the second network domain, the address of the second border device includes a MAC address, and the destination address of the second network domain includes an IP address.

In a possible design, with reference to the second aspect or the possible design of the second aspect, the first network domain is a user-side network domain, and the second network domain is a server-side network domain, or the first network domain is a server-side network domain, and the second network domain is a user-side network domain.

Based on the possible design, the first network domain may be a user-side network domain, and the second network domain may be a server-side network domain, or the first network domain may be a server-side network domain, and the second network domain may be a user-side network domain, which is not limited. In other words, a user-side network domain may implement the method in this embodiment or a service-side network domain may implement the method in this embodiment, thereby improving flexibility of method implementation.

According to a third aspect, a communications apparatus is provided. The communications apparatus may be a controller or a chip or system on chip in the controller. The communications apparatus may implement functions performed by the controller in each of the foregoing aspects or possible designs, and the functions may be implemented by hardware. In one possible design, the communications apparatus may include a transceiver and a processor. The transceiver and the processor may be configured to support the communications apparatus in implementing the function in the first aspect or any possible design of the first aspect. For example, the transceiver may be configured to receive a device address of a first network domain from a first border transport device. The transceiver may be further configured to receive a device address of a second network domain from a second border transport device. The processor may be configured to generate an identifier of a transmission pipe based on the device address of the first network domain and the device address of the second network domain, where the transmission pipe is used to connect the first border transport device and the second border transport device. The transceiver may be further configured to send, to the first border transport device, the identifier of the transmission pipe and the device address that is of the second network domain and that corresponds to the transmission pipe, where the identifier of the transmission pipe and the device address that is of the second network domain and that corresponds to the transmission pipe are used to generate a forwarding table that is of the first border transport device and that is used to indicate a forwarding relationship in which service data is forwarded from the device address of the first network domain to the device address of the second network domain by using the transmission pipe. In another possible design, the communications apparatus may further include a memory, and the memory is configured to store computer execution instructions and data that are necessary for the communications apparatus. When the communications apparatus runs, the processor executes the computer execution instructions stored in the memory, so that the communications apparatus performs the transmission pipe configuration method in the first aspect or any possible design of the first aspect.

For a specific implementation of the communications apparatus, refer to a behavior function of the controller in the transmission pipe configuration method provided in the first aspect or any possible design of the first aspect.

According to a fourth aspect, a communications apparatus is provided. The communications apparatus includes one or more processors and one or more memories, and the one or more memories are coupled to the one or more processors. The one or more memories are configured to store computer program code or computer instructions, and when the one or more processors execute the computer instructions, the communications apparatus is enabled to perform the transmission pipe configuration method in the first aspect or any possible design of the first aspect.

According to a fifth aspect, a computer-readable storage medium is provided. The computer-readable storage medium stores computer instructions or a program, and when the computer instructions or the program is run on a computer, the computer is enabled to perform the transmission pipe configuration method in the first aspect or any possible design of the first aspect.

According to a sixth aspect, a computer program product including instructions is provided. When the computer program product is run a computer, the computer is enabled to perform the transmission pipe configuration method in the first aspect or any possible design of the first aspect.

For technical effects brought by any design manner in the third aspect to the sixth aspect, refer to technical effects brought by any possible design in the first aspect and the second aspect. Details are not described again.

According to a seventh aspect, a transmission pipe configuration method is provided, and the method is applied to a first border transport device located in a transport network. The transport network is centrally controlled by using a controller, and the transport network is configured to connect a first network domain and a second network domain. The first network domain includes a first border device, the second network domain includes a second border device, and the first border transport device is connected to the first border device. The method includes the first border transport device receives a device address of the first network domain from the first border device, the first border transport device sends the device address of the first network domain to the controller, the first border transport device receives, from the controller, an identifier of a transmission pipe and a device address that is of the second network domain and that corresponds to the transmission pipe, where the transmission pipe is used to connect the first border transport device and a second border transport device, and the first border transport device generates, based on the identifier of the transmission pipe and the device address that is of the second network domain and that corresponds to the transmission pipe, a forwarding table that is of the first border transport device and that is used to indicate a forwarding relationship in which service data is forwarded from the device address of the first network domain to the device address of the second network domain by using the transmission pipe.

Based on the method in the seventh aspect, the first border transport device sends the received device address of the first network domain to the controller, so that the controller can obtain the device address of the first network domain without manual static configuration, thereby reducing working difficulty in initially collecting the device address of the first network domain and the device address of the second network domain. The controller generates the identifier of the transmission pipe based on the received device address of the first network domain and the device address of the second network domain, to facilitate establishment of the transmission pipe. In addition, the first border transport device generates the forwarding table based on the received identifier of the transmission pipe and the received device address that is of the second network domain and that corresponds to the transmission pipe, so that the first border transport device subsequently forwards, to the second network domain based on the forwarding table, service data from the device address of the first network domain by using the transmission pipe corresponding to the device address of the second network domain.

In a possible design, with reference to the seventh aspect, the device address of the first network domain includes an address of the first border device and/or a destination address of the first network domain. For example, the device address of the first network domain includes the address of the first border device, or the device address of the first network domain includes the address of the first border device and the destination address of the first network domain.

Based on the possible design, when the device address of the first network domain includes the address of the first border device, the controller may generate a transmission pipe corresponding to the address of the first border device and an address of the second border device, so that the first border device forwards service data to the second border device by using the transmission pipe corresponding to the first border device. Alternatively, when the device address of the first network domain includes the address of the first border device and the destination address of the first network domain, the controller may generate a transmission pipe corresponding to the destination address of the first network domain and the address of the second border device, so that the first border device forwards, to the second border device, received service data from the destination address of the first network domain by using the transmission pipe corresponding to the destination address of the first network domain.

In a possible design, with reference to the seventh aspect or the possible design of the seventh aspect, the first border transport device communicates with the first border device based on a control protocol in a network layer or a data link layer.

According to an eighth aspect, a first border transport device is provided. The first border transport device may implement functions performed by the first border transport device in the seventh aspect or the possible design of the seventh aspect, and the functions may be implemented by executing corresponding software by using hardware. The hardware or the software includes one or more modules corresponding to the functions. For example, the first border transport device includes a receiving module, a sending module, and a processing module.

The receiving module is configured to receive a device address of a first network domain from a first border device.

The sending module is configured to send the device address of the first network domain to a controller.

The receiving module is further configured to receive, from the controller, an identifier of a transmission pipe and a device address that is of a second network domain and that corresponds to the transmission pipe, where the transmission pipe is used to connect the first border transport device and a second border transport device.

The processing module is configured to generate, based on the identifier of the transmission pipe and the device address that is of the second network domain and that corresponds to the transmission pipe, a forwarding table that is of the first border transport device and that is used to indicate a forwarding relationship in which service data is forwarded from the device address of the first network domain to the device address of the second network domain by using the transmission pipe.

For a specific implementation of the first border transport device, refer to a behavior function of the first border transport device in the transmission pipe configuration method provided in the seventh aspect or any possible design of the seventh aspect. Based on the communications apparatus in the eighth aspect, the first border transport device sends the received device address of the first network domain to the controller, so that the controller can obtain the device address of the first network domain without manual static configuration, thereby reducing working difficulty in initially collecting the device address of the first network domain and the device address of the second network domain. The controller generates the identifier of the transmission pipe based on the received device address of the first network domain and the device address of the second network domain, to facilitate establishment of the transmission pipe. In addition, the first border transport device generates the forwarding table of the first border transport device based on the received identifier of the transmission pipe and the received device address that is of the second network domain and that corresponds to the transmission pipe, so that the first border transport device subsequently forwards, to the second network domain based on the forwarding table, service data from the device address of the first network domain by using the transmission pipe corresponding to the device address of the second network domain.

In a possible design, with reference to the eighth aspect, the device address of the first network domain includes an address of the first border device and/or a destination address of the first network domain. For example, the device address of the first network domain includes the address of the first border device, or the device address of the first network domain includes the address of the first border device and the destination address of the first network domain.

Based on the possible design, when the device address of the first network domain includes the address of the first border device, the controller may generate a transmission pipe corresponding to the address of the first border device and an address of a second border device, so that the first border device forwards service data to the second border device by using the transmission pipe corresponding to the first border device. Alternatively, when the device address of the first network domain includes the address of the first border device and the destination address of the first network domain, the controller may generate a transmission pipe corresponding to the destination address of the first network domain and the address of the second border device, so that the first border device forwards, to the second border device, received service data from the destination address of the first network domain by using the transmission pipe corresponding to the destination address of the first network domain.

In a possible design, with reference to the eighth aspect or the possible design of the eighth aspect, the first border transport device communicates with the first border device based on a control protocol in a network layer or a data link layer.

According to a ninth aspect, a communications apparatus is provided. The communications apparatus may be a border transport device or a chip or system on chip in the border transport device. The communications apparatus may implement functions performed by the border transport device in each of the foregoing aspects or possible designs, and the functions may be implemented by hardware. In one possible design, the communications apparatus may include a transceiver and a processor. The transceiver and the processor may be configured to support the communications apparatus in implementing the function in the seventh aspect or any possible design of the seventh aspect. For example, the transceiver may be configured to receive a device address of a first network domain from a first border device. The transceiver may be configured to send the device address of the first network domain to a controller. The transceiver may be further configured to receive, from the controller, an identifier of a transmission pipe and a device address that is of a second network domain and that corresponds to the transmission pipe, where the transmission pipe is used to connect a first border transport device and a second border transport device. The processor may be configured to generate, based on the identifier of the transmission pipe and the device address that is of the second network domain and that corresponds to the transmission pipe, a forwarding table that is of the first border transport device and that is used to indicate a forwarding relationship in which service data is forwarded from the device address of the first network domain to the device address of the second network domain by using the transmission pipe. In another possible design, the communications apparatus may further include a memory, and the memory is configured to store computer execution instructions and data that are necessary for the communications apparatus. When the communications apparatus runs, the transceiver executes the computer execution instructions stored in the memory, so that the communications apparatus performs the transmission pipe configuration method in the seventh aspect or any possible design of the seventh aspect.

For a specific implementation of the communications apparatus, refer to a behavior function of the first border transport device in the transmission pipe configuration method provided in the seventh aspect or any possible design of the seventh aspect.

According to a tenth aspect, a communications apparatus is provided. The communications apparatus includes one or more processors and one or more memories, and the one or more memories are coupled to the one or more processors. The one or more memories are configured to store computer program code or computer instructions, and when the one or more processors execute the computer instructions, the communications apparatus is enabled to perform the transmission pipe configuration method in the seventh aspect or any possible design of the seventh aspect.

According to an eleventh aspect, a computer-readable storage medium is provided. The computer-readable storage medium stores computer instructions or a program, and when the computer instructions or the program is run on a computer, the computer is enabled to perform the transmission pipe configuration method in the seventh aspect or any possible design of the seventh aspect.

According to a twelfth aspect, a computer program product including instructions is provided. When the computer program product is run a computer, the computer is enabled to perform the transmission pipe configuration method in the seventh aspect or any possible design of the seventh aspect.

For technical effects brought by any design manner in the ninth aspect to the twelfth aspect, refer to technical effects brought by any possible design in the seventh aspect and the eighth aspect. Details are not described again.

According to a thirteenth aspect, a communications system is provided. The communications system includes the communications apparatus in the second aspect or any possible design of the second aspect, and the first border transport device in the eighth aspect or any possible design of the eighth aspect.

BRIEF DESCRIPTION OF THE DRAWINGS

FIG. 4 is a schematic diagram of a service mapping table according to an embodiment of this application;

FIG. 5a is a schematic diagram of a forwarding table of a first border transport device according to an embodiment of this application;

FIG. 5b is a schematic diagram of a forwarding table of a second border transport device according to an embodiment of this application;

FIG. 7 is a schematic diagram of a service mapping table according to an embodiment of this application;

FIG. 8 is a schematic diagram of a forwarding table of a second border transport device according to an embodiment of this application;

DETAILED DESCRIPTION OF ILLUSTRATIVE EMBODIMENTS

A transmission pipe configuration method provided in embodiments of this application is described below with reference to the accompanying drawings of the specification.

Figure 1A:
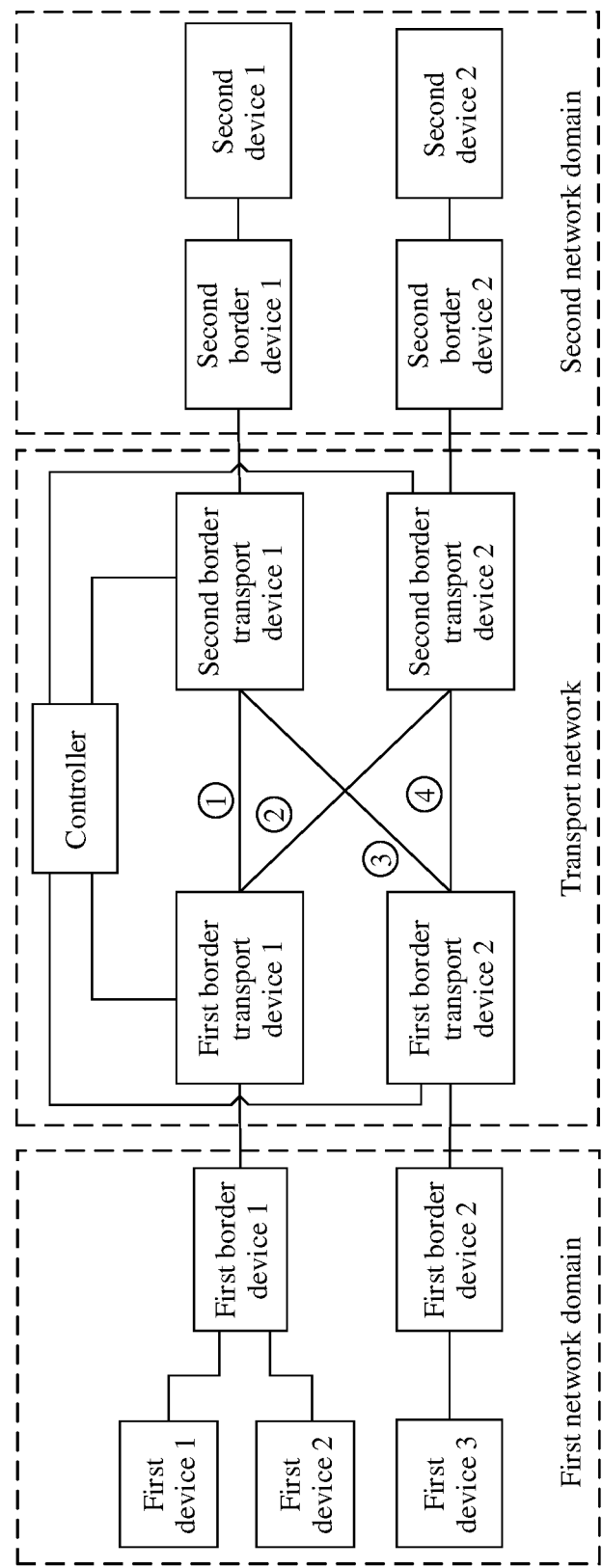
FIG. 1a is a schematic diagram of simplification of a communications system according to an embodiment of this application.

The transmission pipe configuration method provided in embodiments of this application may be applied to a communications system shown in FIG. 1a. The communications system includes a first network domain, a transport network, and a second network domain. The transport network is configured to connect the first network domain and the second network domain, to transmit service data between the first network domain and the second network domain.

Specifically, the transport network may be a network configured to transmit service data, for example, may be a network such as an optical transport network (OTN) or a synchronous digital hierarchy (SDH) network, which is not limited. The first network domain and the second network domain each may be an Internet Protocol (IP) network.

The transmission pipe configuration method provided in embodiments of this application is described below by using FIG. 1a and FIG. 1b as examples.

Specifically, the transport network may include a plurality of transmission pipes, a first border transport device, and a second border transport device. For example, the transport network is an OTN. A transmission pipe corresponding to a first border device and a second border device may be established, or a transmission pipe corresponding to a first device and the second border device may be established. For example, the transmission pipe corresponding to the first border device and the second border device is established. As shown in FIG. 1a, the transport network may include a transmission pipe 1, a transmission pipe 2, a transmission pipe 3, and a transmission pipe 4. Each transmission pipe is used to connect the first border transport device and the second border transport device. The first border transport device may be connected to at least one first border device, and the second border transport device may be connected to at least one second border device. In other words, a connection is established between the first border device and the second border device by using the transmission pipe. Different transmission pipes correspond to different bandwidths and delays. Different service data is transmitted by using different transmission pipes, to implement bandwidth isolation and delay stability, thereby meeting a user requirement.

Further, as shown in FIG. 1a, the transport network may include a controller, and the transport network is centrally controlled by using the controller. The controller may be a software defined network (SDN) controller independently deployed outside the transport network or a central control unit (CCU) located in the transport network.

It should be noted that the controller may be unnecessarily centrally deployed in the transport network, as shown in FIG. 1a, and may be deployed independent of the transport network. In embodiments of this application, a name of the transmission pipe is not limited. For example, when the transport network is the OTN, the transmission pipe may be named as an OTN pipe.

The first network domain may include at least one first border device and at least one first device connected to the first border device. The first border device may be a device configured to send/receive service data, and the first border device may be a device configured to transmit service data between the first device and the transport network.

Similarly, the second network domain may include at least one second border device and at least one second device connected to the second border device. The second border device may be a device configured to send/receive service data, and the second border device may be a device configured to transmit service data between the second device and the transport network.

In embodiments of this application, the first network domain and the second network domain are two network domains that transmit service data to each other by using the transport network. For example, the first network domain sends service data to the second network domain by using the transport network. As shown in FIG. 1a, the first device sends, to the first border device, service data including a destination address, where the destination address is used to identify a second device. The first border device determines, from a preconfigured routing table, an IP address of a next-hop second border device of the first border device based on the destination address of the received service data, determines a MAC address of the next-hop second border device of the first border device based on a preconfigured ARP table, and sends the service data to the next-hop second border device of the first border device based on the MAC address by using the transmission pipe. The next-hop second border device forwards the received service data to the corresponding second device based on the destination address of the received service data.

It should be noted that a process in which the second network domain sends service data to the first network domain by using the transport network is similar to the foregoing process. Details are not described again.

For example, the first network domain may be a user-side network domain, and the second network domain may be a server-side network domain, or the first network domain may be a server-side network domain, and the second network domain may be a user-side network domain.

For example, the first network domain is a user-side network domain, the transport network is an OTN, and the second network domain is a server-side network domain. The first device may be a user-side network device, the first border device may be a user-side border device, the first border transport device may be a user-side border OTN device, the second border transport device may be a server-side border OTN device, the second border device may be a server-side border device, and the second device may be a server-side network device. A connection may be established between the user-side border device and the server-side border device by using an OTN pipe, where one end of the OTN pipe is the user-side border OTN device, and the other end is the server-side border OTN device.

Figure 1B:
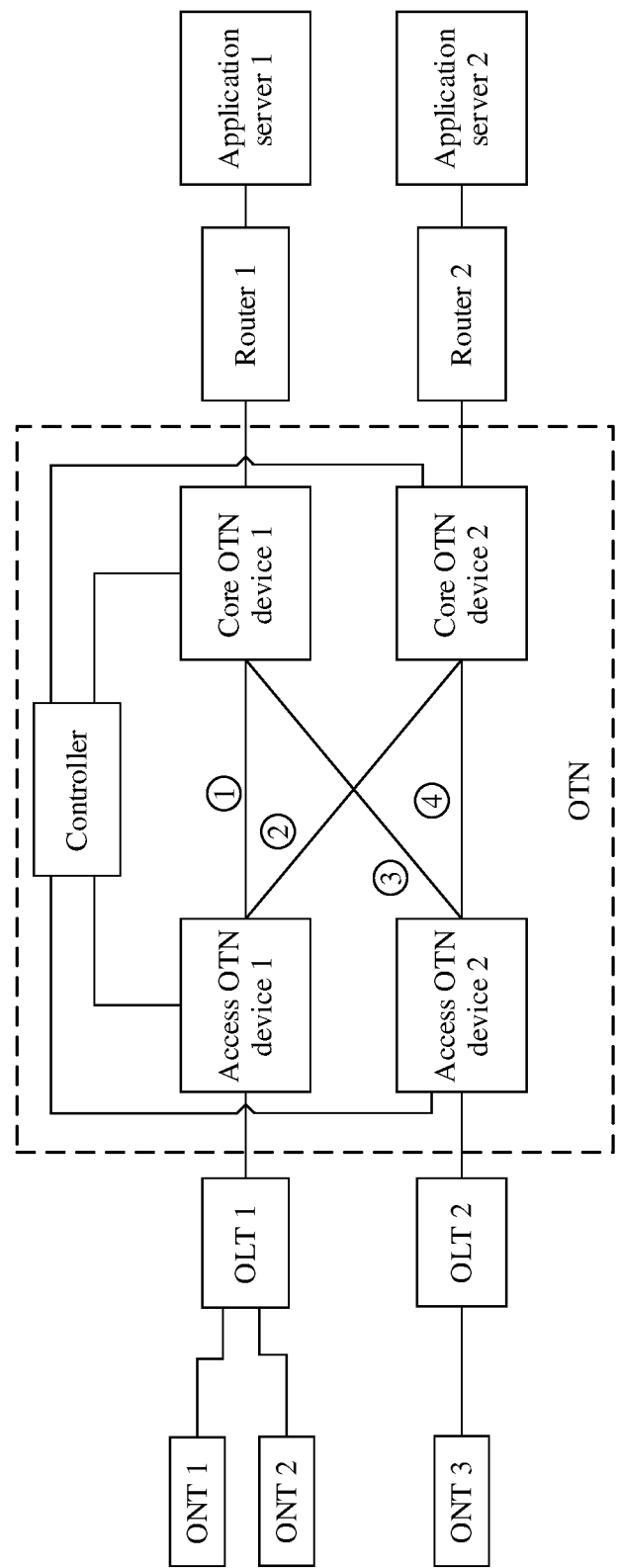
FIG. 1b is a schematic diagram of simplification of a communications system according to an embodiment of this application.

For example, the user-side network device may be an ONT shown in FIG. 1b, the user-side border device may be an OLT shown in FIG. 1b, the user-side border transport device may be an access OTN device shown in FIG. 1b, the server-side border transport device may be a core OTN device shown in FIG. 1b, the server-side border device may be a gateway or a route switching device such as a router shown in FIG. 1b, and the server-side network device may be an application server shown in FIG. 1b.

The ONT shown in FIG. 1b may be further connected to at least one user equipment. The user equipment (UE) may be referred to as a terminal (terminal), a mobile station (MS), a mobile terminal (MT), or the like. Specifically, the user equipment may be a mobile phone, a tablet computer, or a computer with a wireless receiving/transmitting function. The user equipment may alternatively be a virtual reality (VR) terminal, an augmented reality (AR) terminal, a wireless terminal in industrial control, a wireless terminal in self-driving, a wireless terminal in remote medical, a wireless terminal in a smart grid, a wireless terminal in a smart city, a wireless terminal in a smart home, an in-vehicle terminal, or the like. This is not limited.

It should be noted that in this embodiment of this application, at least one first device, at least one first border device, at least one first border transport device, at least one second border transport device, at least one second border device, and at least one second device each may be one or more chips or systems on chips (system on chip, SOC) or the like. FIG. 1a is merely an example accompany drawing, and includes an unlimited quantity of devices. In addition, in addition to the devices shown in FIG. 1a, the communications system may further include another device. A name of each device and a name of each transmission pipe in FIG. 1a are not limited. In addition to the name shown in FIG. 1a, each device and each transmission pipe may be named as other names. For example, when the first network domain and the second network domain communicate with each other by using the OTN, the transmission pipe may be named as an OTN pipe, an optical layer pipe, or the like. The transmission pipe may be an electrical layer pipe, an MPLS tunnel, or the like. This is not limited.

For example, in FIG. 1b, an OTN pipe corresponding to an OLT and a router is established. When the OTN pipe is established in an existing transport network, addresses of an OLT and of a router that exist in a communications system using the OTN is manually determined. The address of the OLT and the address of the router are configured into a central control unit (CCU) in the OTN in a manual static configuration manner. The CCU determines at least one OTN pipe based on the address of the OLT and the address of the router, where one end of each pipe is an access OTN device, and the other end is a core OTN device, and sends, to a corresponding access OTN device and a core OTN device, an address of an OLT and an address of a router that correspond to each OTN pipe. However, a quantity of OLTs is huge in the communications system, and the CCU cannot learn of the addresses of the OLT and the router that exist in the communications system. Therefore, when the foregoing manual static configuration manner is used, working difficulty in initially collecting the address of the OLT and the address of the router is increased, which is not helpful in establishment the OTN pipe.

To resolve the foregoing technical problem, embodiments of this application provide a transmission pipe configuration method, and the method is applied to a controller. The method includes the controller receives a device address of a first network domain from a first border transport device, and receives a device address of a second network domain from a second border transport device, and generates an identifier of a transmission pipe based on the device address of the first network domain and the device address of the second network domain, where the transmission pipe is used to connect the first border transport device and the second border transport device. The controller sends, to the first border transport device, the identifier of the transmission pipe and the device address that is of the second network domain and that corresponds to the transmission pipe, where the identifier of the transmission pipe and the device address that is of the second network domain and that corresponds to the transmission pipe are used to generate a forwarding table that is of the first border transport device and that is used to indicate a forwarding relationship in which service data is forwarded from the device address of the first network domain to the device address of the second network domain by using the transmission pipe. Specifically, for the transmission pipe configuration method provided in embodiments of this application, refer to descriptions in the following embodiments corresponding to FIG. 3, FIG. 6, FIG. 9, and FIG. 10.

In this way, the controller may receive the device address of the first network domain and the device address of the second network domain by using the first border transport device and the second border transport device without manual static configuration, thereby reducing working difficulty in initially collecting the device address of the first network domain and the device address of the second network domain. In addition, the controller may directly generate the identifier of the transmission pipe based on the received device address of the first network domain and the received device address of the second network domain, to facilitate establishment of the transmission pipe. Moreover, the controller sends, to the first border transport device, the identifier of the transmission pipe and the device address that is of the second network domain and that corresponds to the transmission pipe, so that the first border transport device generates a corresponding forwarding table, and the first border transport device subsequently forwards, to the second network domain based on the forwarding table, service data from the device address of the first network domain by using the transmission pipe corresponding to the device address of the second network domain.

Figure 2:
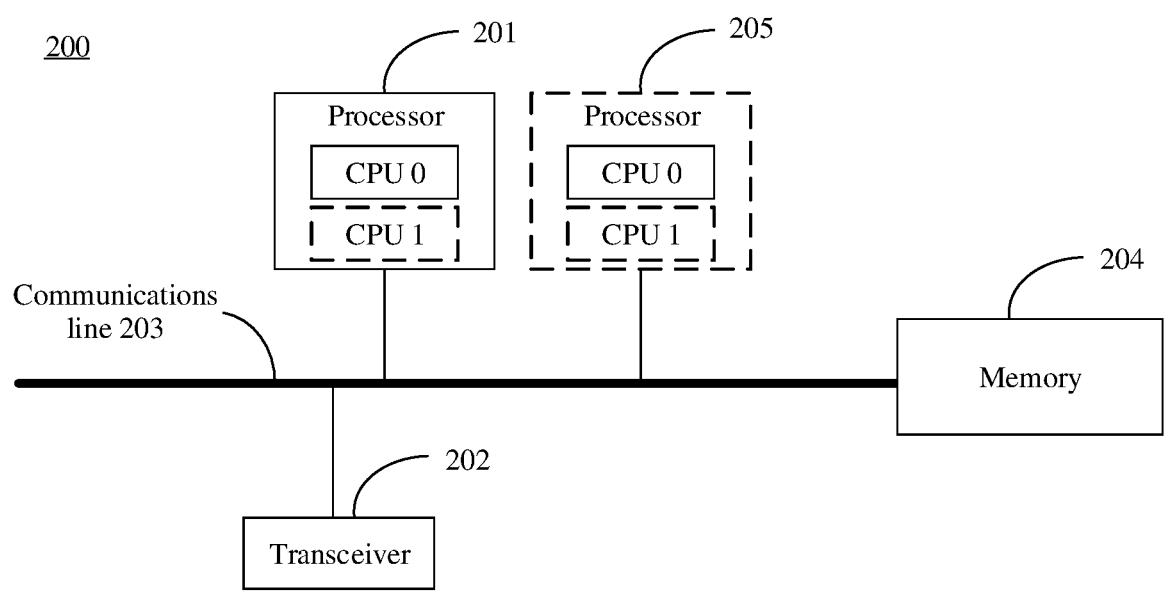
FIG. 2 is a schematic diagram of composition of a communications apparatus according to an embodiment of this application.

In specific implementation, all devices in FIG. 1a, such as the first device, the first border device, the first border transport device, the controller, the second border transport device, the second border device, and the second device, may use a composition structure shown in FIG. 2 or include a component shown in FIG. 2. FIG. 2 is a schematic diagram of composition of a communications apparatus 200 according to an embodiment of this application. The communications apparatus 200 may be a first device or a chip or system on chip in the first device, may be a first border device or a chip or system on chip in the first border device, may be a first border transport device or a chip or system on chip in the first border transport device, may be a controller or a chip or system on chip in the controller, may be a second border transport device or a chip or system on chip in the second border transport device, may be a second border device or a chip or system on chip in the second border device, or may be a second device or a chip or system on chip in the second device. As shown in FIG. 2, the communications apparatus 200 includes a processor 201, a transceiver 202, and a communications line 203.

Further, the communications apparatus 200 may include a memory 204. The processor 201, the memory 204, and the transceiver 202 may be connected by using the communications line 203.

The processor 201 is a central processing unit (CPU), a general-purpose processor, a network processor (NP), a digital signal processor (DSP), a microprocessor, a microcontroller, a programmable logic device (PLD), or any combination thereof. The processor 201 may be another apparatus that has a processing function, for example, a circuit, a component, or a software module. This is not limited.

The transceiver 202 is configured to communicate with another device or another communications network. The another communications network may be an Ethernet, a radio access network (RAN), a wireless local area network (WLAN), or the like. The transceiver 202 may be a module, a circuit, a transceiver, or any apparatus that can implement communication.

The communications line 203 is configured to transmit information between components included in the communications apparatus 200.

The memory 204 is configured to store instructions. The instruction may be a computer program.

The memory 204 may be a read-only memory (ROM) or another type of static storage device that can store static information and/or instructions, may be a random access memory (RAM) or another type of dynamic storage device that can store information and/or instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a magnetic disk storage medium, or another magnetic storage device. This is not limited.

It should be noted that the memory 204 may exist independent of the processor 201 or may be integrated with the processor 201. The memory 204 may be configured to store instructions, program code, some data, or the like. The memory 204 may be located in the communications apparatus 200 or may be located outside the communications apparatus 200. This is not limited. The processor 201 is configured to execute the instructions stored in the memory 204, to implement the transmission pipe configuration method provided in the following embodiments of this application.

In an example, the processor 201 may include one or more CPUs, for example, a CPU 0 and CPU 1 in FIG. 2.

In an optional implementation, the communications apparatus 200 includes a plurality of processors. For example, in addition to the processor 201 in FIG. 2, the communications apparatus 200 may further include a processor 205.

It should be noted that the communications apparatus 200 may be a network server, an optical access device, an optical transport device, a gateway, a router, a chip system, or a device having a structure similar to that in FIG. 2. In addition, the composition structure shown in FIG. 2 constitutes no limitation on the communications apparatus. In addition to the components shown in FIG. 2, the communications apparatus may include more or fewer components than those shown in the figure, or combine some components, or have different component arrangements.

In this embodiment of this application, the chip system may include a chip, or may include a chip and another discrete component.

In addition, actions, terms, and the like in embodiments of this application may be mutually referenced. This is not limited. In this embodiment of this application, a name of a message exchanged between devices or a name of a parameter in the message is merely an example. In specific implementation, another name may be used. This is not limited.

The transmission pipe configuration method provided in embodiments of this application is described below with reference to the communications system shown in FIG. 1a by using an example in which the controller generates an identifier of a first transmission pipe based on the received device address of the first network domain of the first border transport device and the received device address of the second network domain of the second border transport device. The first border transport device may be any first border transport device in FIG. 1a, the device address of the first network domain may be a device address of any first border device connected to the first border transport device in FIG. 1a, the second border transport device may be any second border transport device in FIG. 1a, and the device address of the second network domain may be a device address of any second border device connected to the second border transport device in FIG. 1a. The controller, the first border transport device, the first border device, the second border transport device, and the second border device described in the following embodiments may have the components shown in FIG. 2.

It should be noted that in embodiments of this application, when the device address of the first network domain includes an address of the first border device and the device address of the second network domain includes an address of the second border device, the controller may generate an identifier of a first transmission pipe corresponding to the address of the first border device and the address of the second border device. Alternatively, when the device address of the first network domain includes the address of the first border device and a destination address of the first network domain and the device address of the second network domain includes the address of the second border device, the controller may generate an identifier of a second transmission pipe corresponding to the destination address of the first network domain and the address of the second border device.

Figure 3:
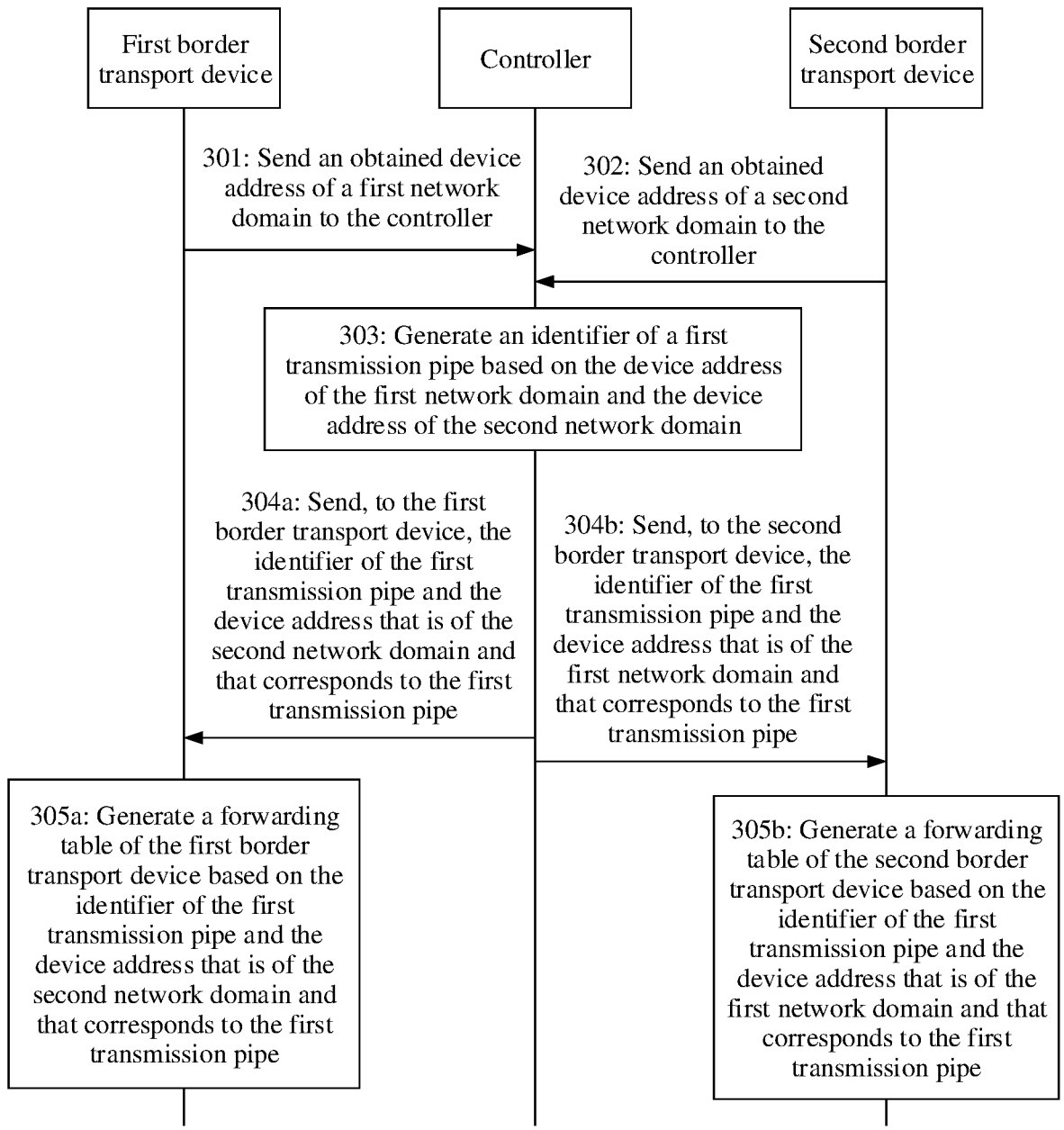
FIG. 3 is a flowchart of a transmission pipe configuration method according to an embodiment of this application.

FIG. 3 is a flowchart of a transmission pipe configuration method according to this application. As shown in FIG. 3, the method includes the following steps.

Step 301: A first border transport device obtains a device address of a first network domain, and sends the device address of the first network domain to a controller.

The device address of the first network domain may be an address of a first border device connected to the first border transport device. Optionally, the address of the first border device is a MAC address.

It should be noted that the first border device connected to the first border transport device may include one or more first border devices. When the first border device connected to the first border transport device includes one first border device, the first border transport device may use a MAC address of the first border device as the device address of the first network domain. Alternatively, when the first border device connected to the first border transport device includes a plurality of first border devices, the first border transport device may use MAC addresses of the plurality of first border devices as the device address of the first network domain.

Specifically, the first border transport device may obtain the device address of the first network domain in the following manner the first border transport device may automatically discover the first border device connected to the first border transport device and obtain the MAC address of the first border device, and use the MAC address of the first border device as the device address of the first network domain.

It should be noted that for a process in which the first border transport device automatically discovers the first border device, refer to the conventional technology. Details are not described.

Further, the first border transport device may automatically discover the first border device in an initial stage of network planning, use the MAC address of the first border device as the device address of the first network domain, and send the device address to the controller. When a plurality of first border transport devices exist in a network, each first border transport device may send, to the controller based on step 301, the device address that is of the first network domain and that is obtained by the first border transport device.

Step 302: A second border transport device obtains a device address of a second network domain, and sends the device address of the second network domain to the controller.

The device address of the second network domain may be an address of a second border device connected to the second border transport device, or the device address of the second network domain may be the address of the second border device connected to the second border transport device and an address of a second device connected to the second border device. This embodiment of this application is described by using an example in which the device address of the second network domain is the address of the second border device connected to the second border transport device. Optionally, the address of the second border device is a MAC address.

It should be noted that the second border device connected to the second border transport device may include one or more second border devices. When the second border device connected to the second border transport device includes one second border device, the second border transport device may use a MAC address of the second border device as the device address of the second network domain. Alternatively, when the second border device connected to the second border transport device includes a plurality of second border devices, the second border transport device may use MAC addresses of the plurality of second border devices as the device address of the second network domain.

Specifically, the second border transport device may obtain the device address of the second network domain in the following manner the second border transport device may automatically discover the second border device connected to the second border transport device and obtain the MAC address of the second border device, and use the MAC address of the second border device as the device address of the second network domain.

It should be noted that for a process in which the second border transport device automatically discovers the second border device, refer to the conventional technology. Details are not described.

Further, the second border transport device may automatically discover the second border device in an initial stage of network planning, use the MAC address of the second border device as the device address of the second network domain, and send the device address to the controller. When a plurality of second border transport devices exist in a network, each second border transport device may send, to the controller based on step 302, the device address that is of the second network domain and that is obtained by the second border transport device.

It should be noted that an execution sequence of step 301 and step 302 is not limited. Step 301 may be first performed, or step 302 may be first performed, or step 301 and step 302 may be simultaneously performed.

Step 303: The controller receives the device address of the first network domain and the device address of the second network domain, and generates an identifier of a first transmission pipe based on the device address of the first network domain and the device address of the second network domain.

Specifically, when the device address of the first network domain is the address of the first border device and the device address of the second network domain is the address of the second border device, the controller may generate, based on the received address of the first border device and the received address of the second border device, the identifier of the first transmission pipe corresponding to the first border device and the second border device.

Using FIG. 1*a* as an example, the controller may generate an identifier 1001 of a first transmission pipe 1 based on a MAC address of a first border device 1 and a MAC address of a second border device 1, generate an identifier 1002 of a first transmission pipe 1 based on the MAC address of the first border device 1 and a MAC address of a second border device 2, generate an identifier 1003 of a first transmission pipe 3 based on a MAC address of a first border device 2 and the MAC address of the second border device 1, and generate an identifier 1004 of a first transmission pipe 4 based on the MAC address of the first border device 2 and the MAC address of the second border device 2.

Optionally, the controller obtains a service mapping table shown in FIG. 4 based on the generated identifier of the first transmission pipe, the address of the first border device corresponding to the first transmission pipe, and the address of the second border device corresponding to the first transmission pipe.

For example, the controller may communicate with the first border transport device and the second border transport device based on a control plane protocol message.

The control plane protocol message may be a message suitable for transmission on a control plane, and a control plane protocol may be control plane protocol in a physical (physical, PHY) layer or a control plane protocol in a bottom layer. The control plane protocol may support the first border transport device in sending the device address of the first network domain to the controller by using a physical layer or a bottom layer, or may support the second border transport device in sending the device address of the second network domain to the controller by using the physical layer or the bottom layer. For example, the control plane protocol may be a path computation element protocol (PCEP).

Further, after generating the identifier of the first transmission pipe based on step 303, the controller may perform the following steps 304*a* and 304*b*, so that the first border transport device performs the following step 305*a* to generate a forwarding table of the first border transport device, and the second border transport device performs the following step 305*b* to generate a forwarding table of the second border transport device.

Step 304*a*: The controller sends, to the first border transport device, the identifier of the first transmission pipe and the device address that is of the second network domain and that corresponds to the first transmission pipe.

Specifically, the controller may directly send, to the first border transport device, a service mapping table generated by the controller, or may send, to the first border transport device, the identifier of the first transmission pipe corresponding to the first border transport device and the address of the second border device corresponding to the first transmission pipe.

For example, using the service mapping table shown in FIG. 4 as an example, the controller may directly send the service mapping table to a first border transport device 1 and a first border transport device 2. The controller may alternatively determine the first border device connected to the first border transport device, and send, to the first border transport device, the identifier of the first transmission pipe corresponding to the first border device and the device address that is of the second network domain and that corresponds to the first transmission pipe. Using FIG. 1*a* as an example, the first border transport device 1 is connected to the first border device 1, and the first border transport device 2 is connected to the first border device 2. It may be learned, based on the service mapping table shown in FIG. 4, that identifiers of first transmission pipes corresponding to the first border device 1 include 1001 and 1002, and that identifiers of first transmission pipes corresponding to the first border device 2 include 1003 and 1004. The controller may send, to the first border transport device 1, 1001 and the MAC address that is of the second border device 1 and that corresponds to 1001, and 1002 and the MAC address that is of the second border device 2 and that corresponds to 1002, and send, to the first border transport device 2, 1003 and the MAC address that is of the second border device 1 and that corresponds to 1003, and 1004 and the MAC address that is of the second border device 2 and that corresponds to 1004.

The controller may send, to the first border transport device based on a control plane protocol message, the identifier of the first transmission pipe and the address of the second border device corresponding to the first transmission pipe. For related descriptions of the control plane protocol message, refer to step 303. Details are not described again.

Further, the controller may receive addresses of second border devices from a plurality of second border transport devices in a transport network, and send, to the first border transport device based on a same control plane protocol message, the addresses that are of the second border devices and that are from the plurality of second border transport devices and an identifier of a first transmission pipe corresponding to the address of each second border device, to reduce signaling interaction.

Step 305*a*: The first border transport device receives the identifier of the first transmission pipe and the device address that is of the second network domain and that corresponds to the first transmission pipe, and generates a forwarding table of the first border transport device.

The forwarding table of the first border transport device may be used to indicate a forwarding relationship in which service data is forwarded from the device address of the first network domain to the device address of the second network domain by using the first transmission pipe.

Specifically, using FIG. 1*a* as an example, the first border transport device may generate a forwarding table shown in FIG. 5*a* based on the identifier of the first transmission pipe and the address of the second border device corresponding to the first transmission pipe. Entries of the forwarding table include the address of the second border device and the identifier of the first transmission pipe corresponding to the address of the second border device, so that the first border transport device forwards, to the second border device based on the forwarding table, service data from the device address of the first network domain by using the first transmission pipe corresponding to the address of the second border device. A forwarding table generated by the first border transport device 1 includes an identifier of a first transmission pipe corresponding to an address of the first border device 1 and an address that is of a second border device and that corresponds to the first transmission pipe. A forwarding table generated by the first border transport device 2 includes an identifier of a first transmission pipe corresponding to an address of the first border device 2 and an address that is of a second border device and that corresponds to the identifier of the first transmission pipe.

Step 304b: The controller sends, to the second border transport device, the identifier of the first transmission pipe and the device address that is of the first network domain and that corresponds to the first transmission pipe.

Specifically, the controller may directly send, to the second border transport device, a service mapping table generated by the controller, or may send, to the second border transport device, the identifier of the first transmission pipe corresponding to the second border transport device and the address of the first border device corresponding to the first transmission pipe.

For example, using the service mapping table shown in FIG. 4 as an example, the controller may directly send the service mapping table to a second border transport device 1 and a second border transport device 2. The controller may alternatively determine the second border device connected to the second border transport device, and send, to the second border transport device, the identifier of the first transmission pipe corresponding to the second border device and the device address that is of the first network domain and that corresponds to the first transmission pipe. Using FIG. 1a as an example, the second border transport device 1 is connected to the second border device 1, and the second border transport device 2 is connected to the second border device 2. It may be learned, based on the service mapping table shown in FIG. 4, that identifiers of first transmission pipes corresponding to the second border device 1 include 1001 and 1003, and that identifiers of first transmission pipes corresponding to the second border device 2 include 1002 and 1004. The controller may send, to the second border transport device 1, 1001 and the MAC address that is of the first border device 1 and that corresponds to 1001, and 1003 and the MAC address that is of the first border device 2 and that corresponds to 1003, and send, to the second border transport device 2, 1002 and the MAC address that is of the first border device 1 and that corresponds to 1002, and 1004 and the MAC address that is of the first border device 2 and that corresponds to 1004.

The controller may send, to the second border transport device based on a control plane protocol message, the identifier of the first transmission pipe and the device address that is of the first network domain and that corresponds to the first transmission pipe. For related descriptions of the control plane protocol message, refer to step 303. Details are not described again.

Further, the controller may receive addresses of first border devices from a plurality of first border transport devices in the transport network, and send, to the second border transport device based on a same control plane protocol message, the addresses that are of the first border devices and that are from the plurality of first border transport devices and an identifier of a first transmission pipe corresponding to the address of each first border device.

Step 305b: The second border transport device receives the identifier of the first transmission pipe and the device address that is of the first network domain and that corresponds to the first transmission pipe, and generates a forwarding table of the second border transport device.

The forwarding table is used to indicate a forwarding relationship in which service data is forwarded from the device address of the second network domain to the device address of the first network domain by using the first transmission pipe.

Specifically, using FIG. 1a as an example, the second border transport device may generate a forwarding table shown in FIG. 5b based on the identifier of the first transmission pipe and the address of the first border device corresponding to the first transmission pipe. Entries of the forwarding table include the device address of the first network domain and the identifier of the first transmission pipe corresponding to the device address of the first network domain, so that the second border transport device forwards, to the first network domain based on the forwarding table, service data from the device address of the second network domain by using the first transmission pipe corresponding to the device address of the first network domain. A forwarding table generated by the second border transport device 1 includes an identifier of a first transmission pipe corresponding to an address of the second border device 1 and an address that is of a first border device and that corresponds to the first transmission pipe. A forwarding table generated by the second border transport device 2 includes an identifier of a first transmission pipe corresponding to an address of the second border device 2 and an address that is of a first border device and that corresponds to the identifier of the first transmission pipe.

Based on the method in FIG. 3, the controller may receive the device address of the first network domain and the device address of the second network domain by using the first border transport device and the second border transport device without manual static configuration, thereby reducing working difficulty in initially collecting the device address of the first network domain and the device address of the second network domain. In addition, the controller may directly generate the identifier of the first transmission pipe based on the received device address of the first network domain and the received device address of the second network domain, to facilitate establishment of the transmission pipe. Moreover, the controller sends, to the first border transport device, the identifier of the first transmission pipe and the device address that is of the second network domain and that corresponds to the first transmission pipe, and sends, to the second border transport device, the identifier of the first transmission pipe and the device address that is of the first network domain and that corresponds to the first transmission pipe, so that the first border transport device and the second border transport device generate corresponding forwarding tables, and forward service data based on the generated forwarding tables.

In the embodiment shown in FIG. 3, the controller may generate the identifier of the first transmission pipe based on the address of the first border device and the address of the second border device. Similar to FIG. 3, when the device address of the first network domain includes the address of the first border device and a destination address of the first network domain, referring to FIG. 6, the controller may also generate an identifier of a second transmission pipe based on the destination address of the first network domain and the address of the second border device.

Figure 6:
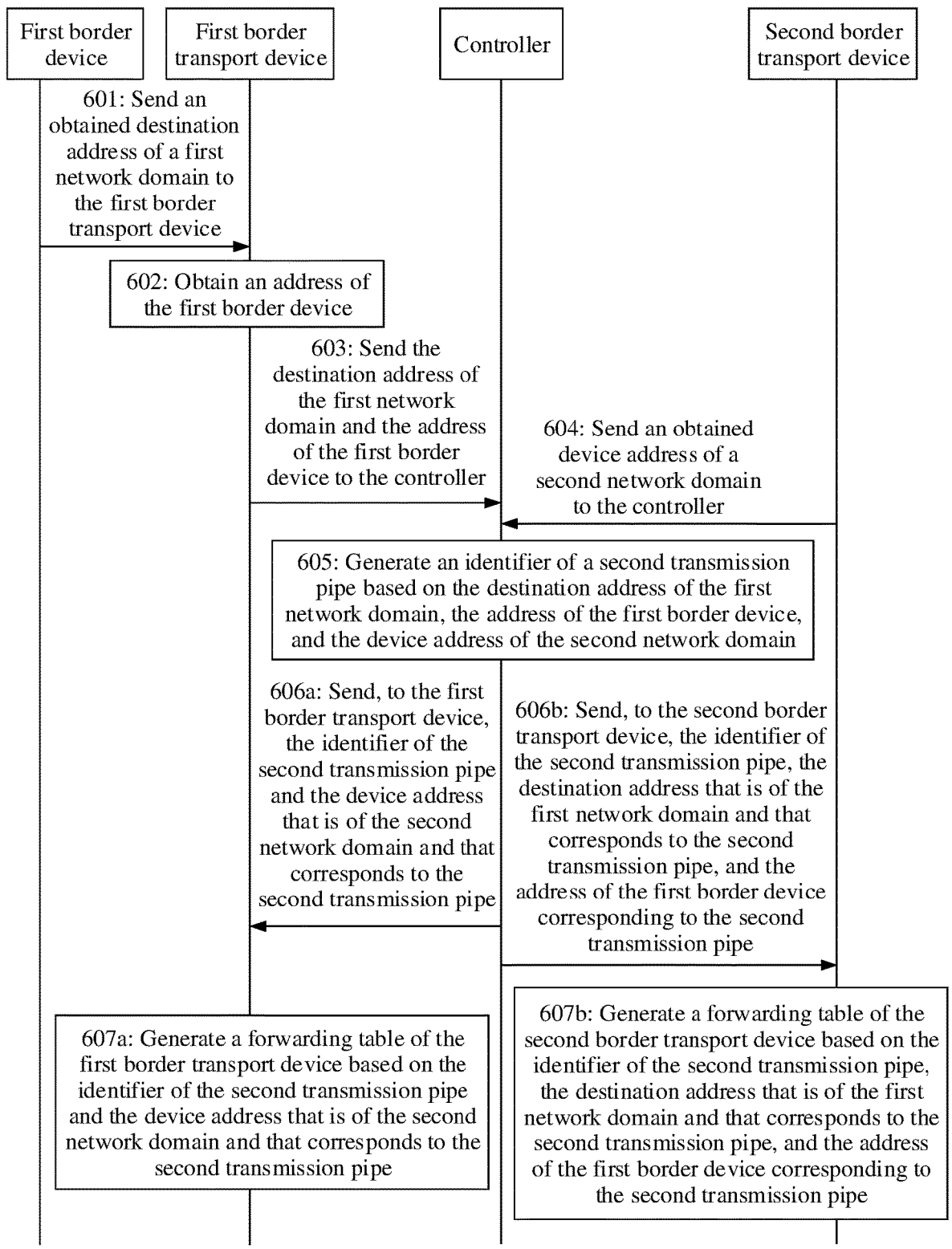
FIG. 6 is a flowchart of a transmission pipe configuration method according to an embodiment of this application.

FIG. 6 is a flowchart of a transmission pipe configuration method according to an embodiment of this application. As shown in FIG. 6, the method includes the following steps.

Step 601: A first border device obtains a destination address of a first network domain, and sends the destination address of the first network domain to a first border transport device.

The destination address of the first network domain may be an address of a first device connected to the first border device. Optionally, the address of the first device is an IP address.

It should be noted that the first device connected to the first border device may include one or more first devices. When the first device connected to the first border device includes one first device, the first border device may use an IP address of the first device as the destination address of the first network domain. Alternatively, when the first device connected to the first border device includes a plurality of first devices, the first border device may use IP addresses of the plurality of first devices as the destination address of the first network domain.

Specifically, the first border device may obtain the destination address of the first network domain in the following manner. The first border device may automatically discover the first device connected to the first border device and obtain the IP address of the first device, and use the IP address of the first device as the destination address of the first network domain. It should be noted that for a process in which the first border device automatically discovers the first device, refer to the conventional technology. Details are not described.

Further, the first border device may automatically discover the first device in an initial stage of network planning, use the IP address of the first device as the destination address of the first network domain, and send the destination address to the first border transport device. When a plurality of first border devices exist in a network, each first border device may send, to a border transport device based on step 601, the destination address that is of the first network domain and that is obtained by the first border device.

For example, the first border device may send the destination address of the first network domain to the first border transport device by using a control protocol in a network layer or a data link layer.

Specifically, when the first border device is connected to a plurality of first devices, the first border device may send IP addresses of the plurality of first devices to the first border transport device based on a same control protocol message in the network layer or the data link layer, to reduce signaling interaction.

Step 602: The first border transport device obtains an address of the first border device.

For specific description of obtaining the address of the first border device by the first border transport device, refer to step 301. Details are not described again.

It should be noted that an execution sequence of step 601 and step 602 is not limited. Step 601 may be first performed, or step 602 may be first performed, or step 601 and step 602 may be simultaneously performed.

Step 603: The first border transport device sends the received destination address of the first network domain and the received address of the first border device to a controller.

Step 604: A second border transport device obtains a device address of a second network domain, and sends the device address of the second network domain to the controller.

The device address of the second network domain includes an address of a second border device.

Specifically, for a processing process of step 604, refer to step 302. Details are not described again.

It should be noted that an execution sequence of step 603 and step 604 is not limited. Step 603 may be first performed, or step 604 may be first performed, or step 603 and step 604 may be simultaneously performed.

Step 605: The controller generates an identifier of a second transmission pipe based on the destination address of the first network domain, the address of the first border device, and the device address of the second network domain.

Specifically, after receiving the address of the first device, the address of the first border device, and the address of the second border device, the controller may generate the identifier of the second transmission pipe corresponding to the first device and the second border device.

Using FIG. 1a as an example, the controller may generate an identifier 2001 of a second transmission pipe 1 based on an IP address of a first device 1, a MAC address of a first border device 1, and a MAC address of a second border device 1, generate an identifier 2002 of a second transmission pipe 2 based on the IP address of the first device 1, the MAC address of the first border device 1, and a MAC address of a second border device 2, generate an identifier 2003 of a second transmission pipe 3 based on an IP address of a first device 2, the MAC address of the first border device 1, and the MAC address of the second border device 1, generate an identifier 2004 of a second transmission pipe 4 based on the IP address of the first device 2, the MAC address of the first border device 1, and the MAC address of the second border device 2, generate an identifier 2005 of a second transmission pipe 5 based on an IP address of a first device 3, the MAC address of the first border device 2, and the MAC address of the second border device 1, and generate an identifier 2006 of a second transmission pipe 6 based on the IP address of the first device 3, the MAC address of the first border device 2, and the MAC address of the second border device 2.

Optionally, the controller obtains a service mapping table shown in FIG. 7 based on the generated identifier of the second transmission pipe, the address of the first device corresponding to the second transmission pipe, the address of the first border device corresponding to the second transmission pipe, and the address of the second border device corresponding to the second transmission pipe.

Step 606a: The controller sends, to the first border transport device, the identifier of the second transmission pipe and the device address that is of the second network domain and that corresponds to the second transmission pipe.

Specifically, for a processing process of step 606a, refer to step 304a. Details are not described again.

Step 607a: The first border transport device receives the identifier of the second transmission pipe and the device address that is of the second network domain and that corresponds to the second transmission pipe, and generates a forwarding table of the first border transport device.

Specifically, for a processing process of step 607a, refer to step 305a. Details are not described again.

Step 606b: The controller sends, to the second border transport device, the identifier of the second transmission pipe, the destination address that is of the first network domain and that corresponds to the second transmission pipe, and the address of the first border device corresponding to the second transmission pipe.

Specifically, a processing process of step 606*b* is similar to that of step 304*b*. Details are not described again.

Step 607*b*: The second border transport device receives the identifier of the second transmission pipe, the destination address that is of the first network domain and that corresponds to the second transmission pipe, and the address of the first border device corresponding to the second transmission pipe, and generates a forwarding table of the second border transport device.

Specifically, FIG. 1*a* is used as an example. The second border transport device may generate a forwarding table shown in FIG. 8 based on the identifier of the second transmission pipe, the address of the first device corresponding to the second transmission pipe, and the address of the first border device corresponding to the first transmission pipe. Entries of the forwarding table include the address of the first device, the address of the first border device corresponding to the address of the first device, and the identifier of the second transmission pipe corresponding to the address of the first device, so that the second border transport device forwards, to the first device based on the forwarding table, service data from the address of the second border device by using the second transmission pipe corresponding to the address of the first device and the address of the first border device. A forwarding table generated by a second border transport device 1 includes an identifier of a second transmission pipe corresponding to an address of the second border device 1, an address that is of a first device and that corresponds to the identifier of the second transmission pipe, and an address that is of a first border device and that corresponds to the identifier of the second transmission pipe. A forwarding table generated by a second border transport device 2 includes an identifier of a second transmission pipe corresponding to an address of the second border device 2, an address that is of a first device and that corresponds to the identifier of the second transmission pipe, and an address that is of a first border device and that corresponds to the identifier of the second transmission pipe.

Based on the method in FIG. 6, the controller may receive the destination address of the first network domain, the address of the first border device, and the device address of the second network domain by using the first border transport device and the second border transport device without manual static configuration, thereby reducing working difficulty in initially collecting the destination address of the first network domain, the address of the first border device, and the device address of the second network domain. In addition, the controller may directly generate the identifier of the second transmission pipe based on the received destination address of the first network domain, the received address of the first border device, and the received device address of the second network domain, to facilitate establishment of the transmission pipe. Moreover, the controller sends, to the first border transport device, the identifier of the second transmission pipe and the device address that is of the second network domain and that corresponds to the second transmission pipe, and sends, to the second border transport device, the identifier of the second transmission pipe, the destination address that is of the first network domain and that corresponds to the second transmission pipe, and the address of the first border device corresponding to the second transmission pipe, so that the first border transport device and the second border transport device generate corresponding forwarding tables, and forward service data based on the generated forwarding tables.

The transmission pipe configuration method provided in this embodiment of this application is described below in detail by using an example in which the first network domain is a user-side network domain, a transport network is an OTN, and the second network domain is a server-side network domain.

Figure 9:
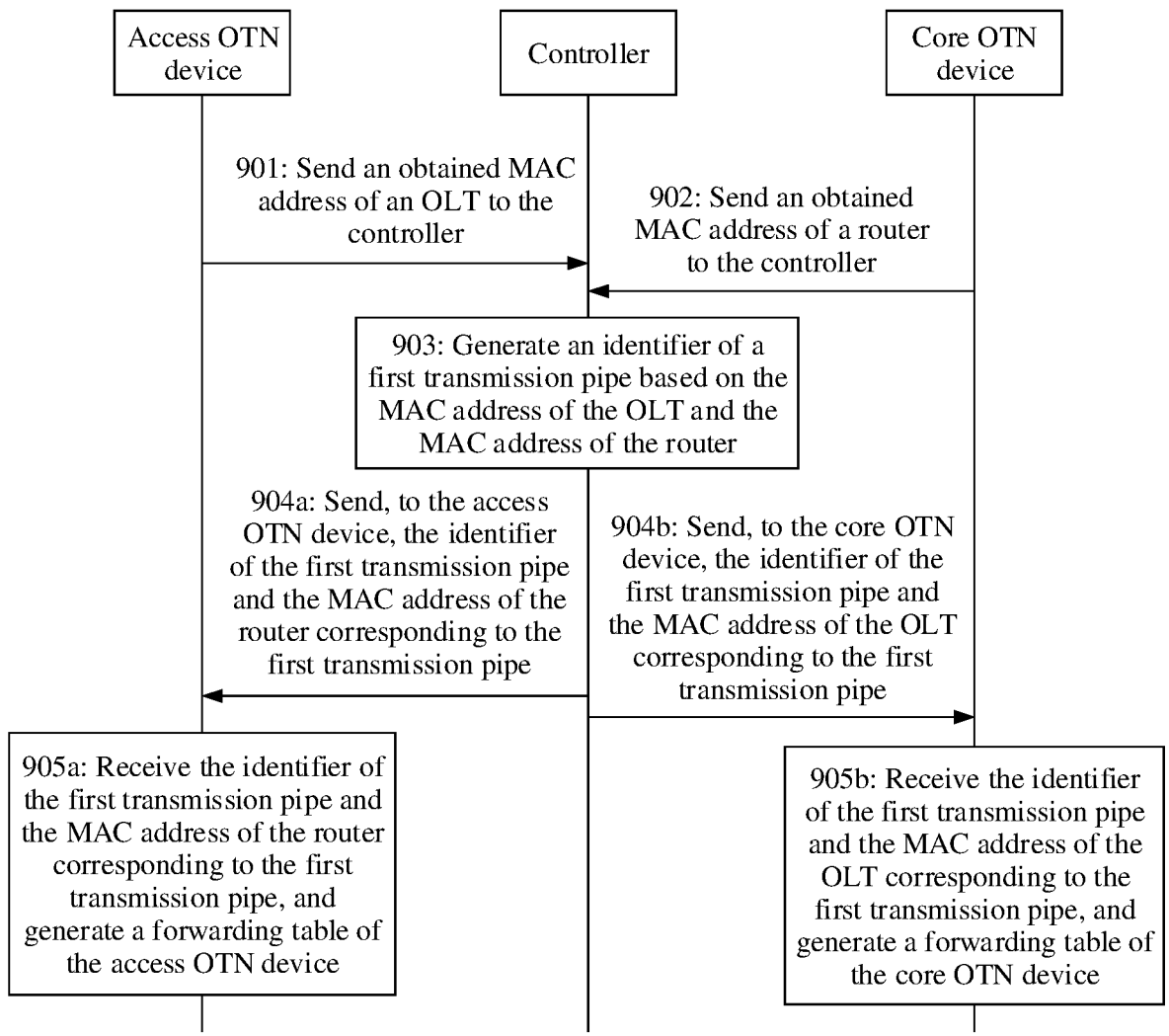
FIG. 9 is a flowchart of a transmission pipe configuration method according to an embodiment of this application.

As shown in FIG. 1*b*, the user-side network domain includes an ONT and an OLT. The OTN includes a controller, an access OTN device, and a core OTN device. The server-side network domain includes a router and an application server. A destination address of the user-side network domain is an IP address of the ONT, and a destination address of the server-side network domain is an IP address of the application server. Referring to FIG. 9, the transmission pipe configuration method provided in embodiments of this application is described by using an example in which the controller generates an identifier of a first transmission pipe based on a received MAC address of the OLT and a received MAC address of the router.

FIG. 9 shows a transmission pipe configuration method according to an embodiment of this application. As shown in FIG. 9, the method includes the following steps.

Step 901: An access OTN device obtains a MAC address of an OLT, and sends the MAC address of the OLT to a controller.

Specifically, the access OTN device may automatically discover an OLT connected to the access OTN device, and obtain a MAC address of the OLT.

Step 902: A core OTN device obtains a MAC address of a router, and sends the MAC address of the router to the controller.

Specifically, the core OTN device may automatically discover a router connected to the core OTN device, and obtain a MAC address of the router.

Step 903: The controller generates an identifier of a first transmission pipe based on the received MAC address of the OLT and the received MAC address of the router.

Specifically, the controller may generate an identifier 1001 of a first transmission pipe 1 based on a MAC address of an OLT 1 and a MAC address of a router 1, generate an identifier 1002 of a first transmission pipe 2 based on the MAC address of the OLT 1 and a MAC address of a router 2, generate an identifier 1003 of a first transmission pipe 3 based on a MAC address of an OLT 2 and the MAC address of the router 1, and generate an identifier 1004 of a first transmission pipe 4 based on the MAC address of the OLT 2 and the MAC address of the router 2.

Step 904*a*: The controller sends, to the access OTN device, the identifier of the first transmission pipe and the MAC address of the router corresponding to the first transmission pipe.

Step 905*a*: The access OTN device receives the identifier of the first transmission pipe and the MAC address of the router corresponding to the first transmission pipe, and generates a forwarding table of the access OTN device.

Specifically, when the access OTN device needs to forward service data to the router, the access OTN device may determine, based on the generated forwarding table, the first transmission pipe corresponding to the MAC address of the router, and forward the service data to the router by using the first transmission pipe.

Step 904*b*: The controller sends, to the core OTN device, the identifier of the first transmission pipe and the MAC address of the OLT corresponding to the first transmission pipe.

Step 905*b*: The core OTN device receives the identifier of the first transmission pipe and the MAC address of the OLT corresponding to the first transmission pipe, and generates a forwarding table of the core OTN device.

Specifically, when the core OTN device needs to forward service data to the OLT, the core OTN device may determine, based on the generated forwarding table, the first transmission pipe corresponding to the MAC address of the OLT, and forward the service data to the OLT by using the first transmission pipe.

Similar to FIG. 9, the transmission pipe configuration method provided in embodiments of this application is described by using an example in which the controller generates an identifier of a second transmission pipe based on a received IP address of the ONT, a received MAC address of the OLT, and a received MAC address of the router.

Figure 10:
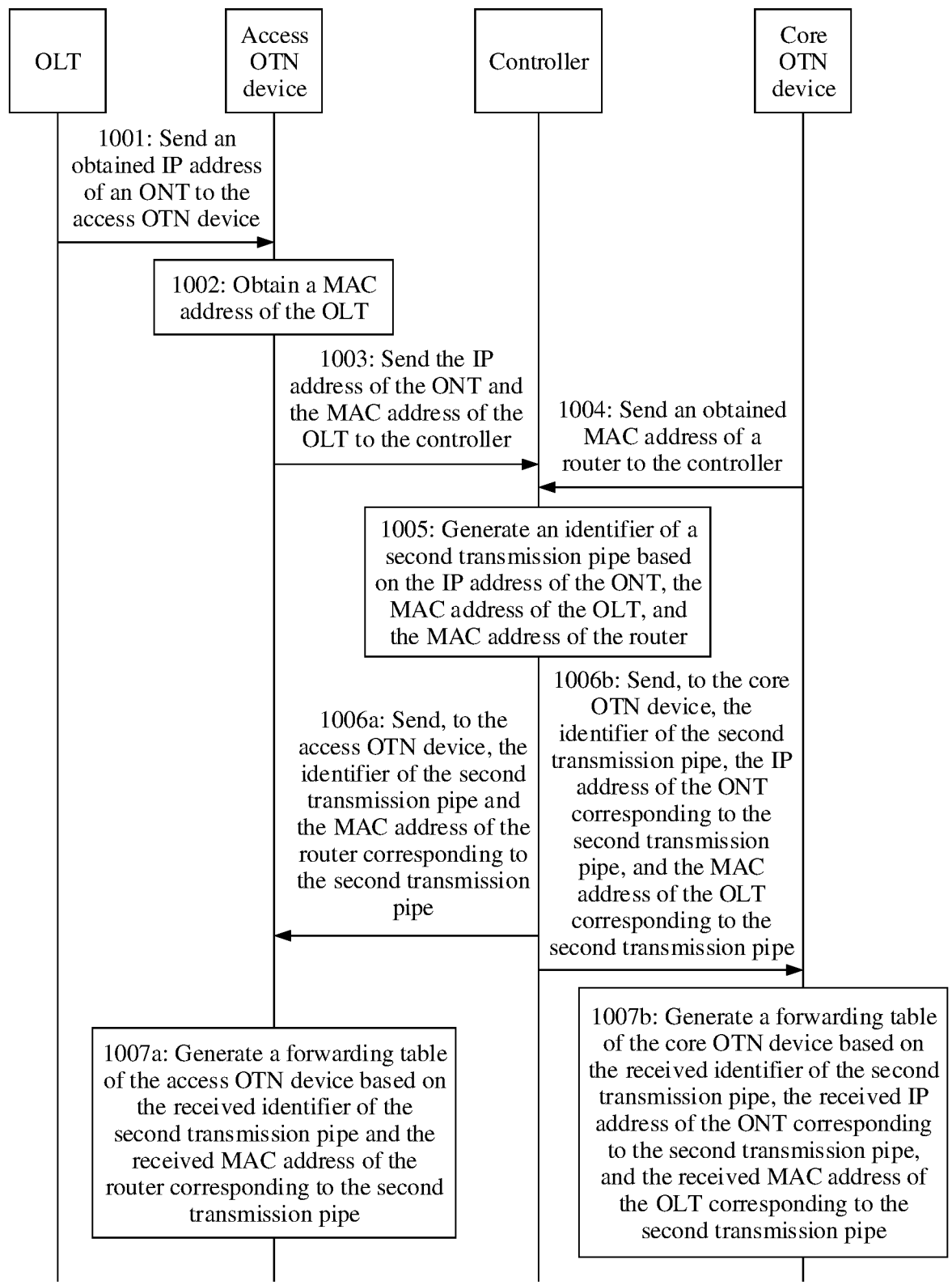
FIG. 10 is a flowchart of a transmission pipe configuration method according to an embodiment of this application.

FIG. 10 is a flowchart of a transmission pipe configuration method according to an embodiment of this application. As shown in FIG. 10, the method includes the following steps.

Step 1001: An OLT obtains an IP address of an ONT, and sends the IP address of the ONT to an access OTN device.

Specifically, the OLT may automatically discover an ONT connected to the OLT, and obtain an IP address of the ONT.

Step 1002: The access OTN device obtains a MAC address of the OLT.

Specifically, the access OTN device may automatically discover an OLT connected to the access OTN device, and obtain a MAC address of the OLT.

Step 1003: The access OTN device sends the IP address of the ONT and the MAC address of the OLT to a controller.

Step 1004: A core OTN device obtains a MAC address of a router, and sends the MAC address of the router to the controller.

Specifically, the core OTN device may automatically discover a router connected to the core OTN device, and obtain a MAC address of the router.

Step 1005: The controller generates an identifier of a second transmission pipe based on the IP address of the ONT, the MAC address of the OLT, and the MAC address of the router.

Specifically, the controller may generate an identifier 2001 of a second transmission pipe 1 based on an IP address of an ONT 1, a MAC address of an OLT 1, and a MAC address of a router 1, generate an identifier 2002 of a second transmission pipe 2 based on the IP address of the ONT 1, the MAC address of the OLT 1, and a MAC address of a router 2, generate an identifier 2003 of a second transmission pipe 3 based on an IP address of an ONT 2, the MAC address of the OLT 1, and the MAC address of the router 1, generate an identifier 2004 of a second transmission pipe 4 based on the IP address of the ONT 2, the MAC address of the OLT 1, and the MAC address of the router 2, generate an identifier 2005 of a second transmission pipe 5 based on an IP address of an ONT 3, a MAC address of an OLT 2, and the MAC address of the router 1, and generate an identifier 2006 of a second transmission pipe 6 based on the IP address of the ONT 3, the MAC address of the OLT 2, and the MAC address of the router 2.

Step 1006*a*: The controller sends, to the access OTN device, the identifier of the second transmission pipe and the MAC address of the router corresponding to the second transmission pipe.

Step 1007*a*: The access OTN device generates a forwarding table of the access OTN device based on the received identifier of the second transmission pipe and the received MAC address of the router corresponding to the second transmission pipe.

Specifically, when the access OTN device needs to forward service data to the router, the access OTN device may determine, based on the generated forwarding table, the second transmission pipe corresponding to the MAC address of the router, and forward the service data to the router by using the second transmission pipe.

Step 1006*b*: The controller sends, to the core OTN device, the identifier of the second transmission pipe, the IP address of the ONT corresponding to the second transmission pipe, and the MAC address of the OLT corresponding to the second transmission pipe.

Step 1007*b*: The core OTN device generates a forwarding table of the core OTN device based on the received identifier of the second transmission pipe, the received IP address of the ONT corresponding to the second transmission pipe, and the received MAC address of the OLT corresponding to the second transmission pipe.

Specifically, when the core OTN device needs to forward service data to the ONT, the core OTN device may determine, based on the generated forwarding table, the second transmission pipe corresponding to the IP address of the ONT, and forward, by using the second transmission pipe, the service data to the ONT by using the OLT corresponding to the second transmission pipe.

The foregoing mainly describes the solutions provided in embodiments of this application from a perspective of interaction between devices. It may be understood that, to implement the foregoing functions, the devices include corresponding hardware structures and/or software modules for performing the functions. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, various network elements may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 11:
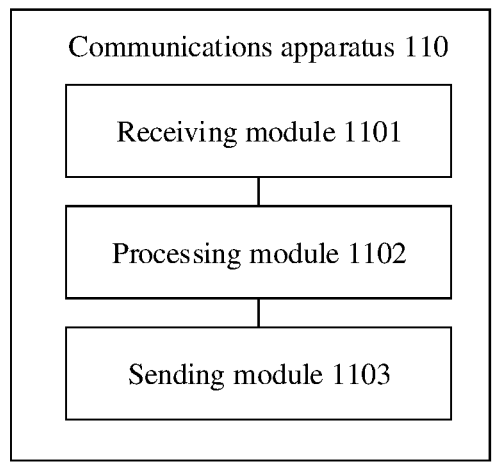
FIG. 11 is a schematic diagram of composition of a communications apparatus according to an embodiment of this application.

When each functional module is obtained through division based on each corresponding function, FIG. 11 shows a communications apparatus. The communications apparatus 110 may be a controller or a chip or system on chip in a controller. The communications apparatus 110 may be configured to perform a function of the controller in the foregoing embodiments. The communications apparatus 110 shown in FIG. 11 includes a receiving module 1101, a processing module 1102, and a sending module 1103.

The receiving module 1101 is configured to receive a device address of a first network domain from a first border transport device.

The receiving module 1101 is further configured to receive a device address of a second network domain from a second border transport device.

The processing module 1102 is configured to generate an identifier of a transmission pipe based on the device address of the first network domain and the device address of the second network domain. The transmission pipe is used to connect the first border transport device and the second border transport device.

The sending module 1103 is configured to send, to the first border transport device, the identifier of the transmission pipe and the device address that is of the second network domain and that corresponds to the transmission pipe. The identifier of the transmission pipe and the device address that is of the second network domain and that corresponds to the transmission pipe are used to generate a forwarding table of the first border transport device, and the forwarding table of the first border transport device is used to indicate a forwarding relationship in which service data is forwarded from the device address of the first network domain to the device address of the second network domain by using the transmission pipe.

For a specific implementation of the communications apparatus 110, refer to behavior functions of the controller in the transmission pipe configuration methods in FIG. 3, FIG. 6, FIG. 9, and FIG. 10.

In a possible design, the sending module 1103 is further configured to send, to the second border transport device, the identifier of the transmission pipe and the device address that is of the first network domain and that corresponds to the transmission pipe. The identifier of the transmission pipe and the device address that is of the first network domain and that corresponds to the transmission pipe are used to generate a forwarding table of the second border transport device, and the forwarding table of the second border transport device is used to indicate a forwarding relationship in which service data is forwarded from the device address of the second network domain to the device address of the first network domain by using the transmission pipe.

In a possible design, the device address of the first network domain includes an address of the first border device and/or a destination address of the first network domain.

In a possible design, the device address of the second network domain includes an address of the second border device and/or a destination address of the second network domain.

In a possible design, the communications apparatus 110 communicates with the first border transport device based on a control plane protocol message.

In a possible design, the communications apparatus 110 communicates with the second border transport device based on a control plane protocol message.

In a possible design, the receiving module 1101 is further configured to receive device addresses of second network domains from a plurality of second border transport devices in the transport network, and the sending module 1103 is further configured to send, to the first border transport device based on a same control plane protocol message, the device addresses that are of the second network domains and that are from the plurality of second border transport devices and an identifier of a transmission pipe corresponding to the device address of each second network domain.

In a possible design, the receiving module 1101 is further configured to receive device addresses of first network domains from a plurality of first border transport devices in the transport network, and the sending module 1103 is further configured to send, to the second border transport device based on a same control plane protocol message, the device addresses that are of the first network domains and that are from the plurality of first border transport devices and an identifier of a transmission pipe corresponding to the device address of each first network domain.

In a possible design, the transmission pipe includes one of an optical layer pipe, an electrical layer pipe, or a multiprotocol label switching (MPLS) tunnel.

In a possible design, the device address of the first network domain includes an Internet Protocol (IP) address and/or a media access control (MAC) address, and the device address of the second network domain includes an Internet Protocol (IP) address and/or a media access control (MAC) address.

In a possible design, the first network domain is a user-side network domain, and the second network domain is a server-side network domain, or the first network domain is a server-side network domain, and the second network domain is a user-side network domain.

In another implementation, the receiving module 1101 and the sending module 1103 in FIG. 11 may be replaced with a transceiver, and the processing module 1102 may be replaced with a processor. Functions of the receiving module 1101 and the sending module 1103 may be integrated into the transceiver, and functions of the processing module 1102 may be integrated into the processor. Further, the communications apparatus 110 shown in FIG. 11 may further include a memory. When the receiving module 1101 and the sending module 1103 are replaced with the transceiver, and the processing module 1102 is replaced with the processor, the communications apparatus 110 in this embodiment of this application may be the communications apparatus shown in FIG. 2.

Figure 12:
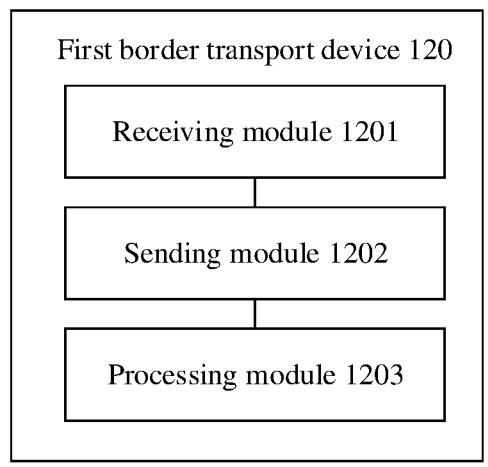
FIG. 12 is a schematic diagram of composition of a communications apparatus according to an embodiment of this application.

When each functional module is obtained through division based on each corresponding function, FIG. 12 shows a first border transport device. The first border transport device 120 may be a first border transport device or a chip or system on chip in a first border transport device. The first border transport device 120 may be configured to perform a function of the first border transport device in the foregoing embodiments. The first border transport device 120 shown in FIG. 12 includes a receiving module 1201, a sending module 1202, and a processing module 1203.

The receiving module 1201 is configured to receive a device address of a first network domain from a first border device.

The sending module 1202 is configured to send the device address of the first network domain to a controller.

The receiving module 1201 is further configured to receive, from the controller, an identifier of a transmission pipe and a device address that is of a second network domain and that corresponds to the transmission pipe. The transmission pipe is used to connect the first border transport device and a second border transport device.

The processing module 1203 is configured to generate a forwarding table of the first border transport device based on the identifier of the transmission pipe and the device address that is of the second network domain and that corresponds to the transmission pipe. The forwarding table of the first border transport device is used to indicate a forwarding relationship in which service data is forwarded from the device address of the first network domain to the device address of the second network domain by using the transmission pipe.

For a specific implementation of the first border transport device 120, refer to behavior functions of the first border transport device in the transmission pipe configuration methods in FIG. 3, FIG. 6, FIG. 9, and FIG. 10.

In a possible design, the device address of the first network domain includes an address of the first border device and/or a destination address of the first network domain.

In a possible design, the first border transport device communicates with the first border device based on a control protocol in a network layer or a data link layer.

In another implementation, the receiving module 1201 and the sending module 1202 in FIG. 12 may be replaced with a transceiver, and the processing module 1203 may be replaced with a processor. Functions of the receiving module 1201 and the sending module 1202 may be integrated into the transceiver, and functions of the processing module 1203 may be integrated into the processor. Further, the first border transport device 120 shown in FIG. 12 may further include a memory. When the receiving module 1201 and the sending module 1202 are replaced with the transceiver, and the processing module 1203 is replaced with the processor, the first border transport device 120 in this embodiment of this application may be the communications apparatus shown in FIG. 2.

An embodiment of this application further provides a computer-readable storage medium. All or some of the processes in the foregoing method embodiments may be completed by a computer program instructing related hardware. The program may be stored in the foregoing computer-readable storage medium. When the program is executed, the processes of the foregoing method embodiments may be performed. The computer-readable storage medium may be an internal storage unit of a terminal (including a data transmit end and/or a data receive end) in any one of the foregoing embodiments, for example, a hard disk or a memory of the terminal. Alternatively, the computer-readable storage medium may be an external storage device of the terminal, for example, a plug-in hard disk, a smart media card (SMC), a secure digital (SD) card, a flash card, or the like that is provided on the terminal. Further, the computer-readable storage medium may alternatively include both the internal storage unit and the external storage device of the terminal. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, the terms "first", "second", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one (piece) of a, b, or c may indicate a, b, c, "a and b", "a and c", "b and c", or "a, b, and c", where a, b, and c may be singular or plural.

Based on the foregoing descriptions of the implementations, a person skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above.

In the several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, in other words, may be located in one place, or may be distributed on different places. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A transmission pipe configuration method, comprising:
receiving, by a controller, from a first border transport device, a device address of a first network domain;
receiving, by the controller, a device address of a second network domain from a second border transport device, wherein the controller is configured to centrally control a transport network that comprises the first border transport device and the second border transport device, wherein the transport network is configured to connect the first network domain and the second network domain, wherein the first network domain comprises a first border device, wherein the second network domain comprises a second border device, wherein the first border transport device is connected to the first border device, and wherein the second border transport device is connected to the second border device;
generating, by the controller, an identifier of a transmission pipe based on the device address of the first network domain and the device address of the second network domain, wherein the transmission pipe connects the first border transport device and the second border transport device; and
sending, by the controller, to the first border transport device, the identifier of the transmission pipe and the device address that is of the second network domain and that corresponds to the transmission pipe, wherein the identifier of the transmission pipe and the device address that is of the second network domain and that corresponds to the transmission pipe are used to generate a forwarding table of the first border transport device, and wherein the forwarding table of the first border transport device indicates a forwarding relationship in which service data is forwarded from the device address of the first network domain to the device address of the second network domain using the transmission pipe.

2. The method according to claim 1, further comprising:
sending, by the controller, to the second border transport device, the identifier of the transmission pipe and the device address that is of the first network domain and that corresponds to the transmission pipe, wherein the identifier of the transmission pipe and the device address that is of the first network domain and that corresponds to the transmission pipe are used to generate a forwarding table of the second border transport device, and whereon the forwarding table of the second border transport device indicates a forwarding relationship in which service data is forwarded from the device address of the second network domain to the device address of the first network domain using the transmission pipe.

3. The method according to claim 1, wherein the device address of the first network domain comprises at least one of an address of the first border device or a destination address of the first network domain.

4. The method according to claim 1, wherein the device address of the second network domain comprises at least one of an address of the second border device or a destination address of the second network domain.

5. The method according to claim 1, further comprising:
communicating, by the controller, with the first border transport device based on a control plane protocol message.

6. The method according to claim 1, further comprising:
communicating, by the controller, with the second border transport device based on a control plane protocol message.

7. The method according to claim 1, further comprising:
receiving, by the controller, device addresses of second network domains from a plurality of second border transport devices in the transport network; and
sending, by the controller, to the first border transport device, based on a same control plane protocol message, the device addresses and an identifier of a transmission pipe corresponding to a device address, of the device addresses, of each second network domain of the second network domains.

8. The method according to claim 1, further comprising:
receiving, by the controller, from a plurality of first border transport devices in the transport network, device addresses of first network domains; and
sending, by the controller, to the second border transport device, based on a same control protocol message, the device addresses and an identifier of a transmission pipe corresponding to a device address, of the device addresses, of each first network domain of the first network domains.

9. The method according to claim 1, wherein the transmission pipe comprises one of an optical layer pipe, an electrical layer pipe, or a multi-protocol label switching (MPLS) tunnel.

10. A transmission pipe configuration method, comprising:
receiving, by a first border transport device, a device address of a first network domain from a first border device, wherein the first border transport device located in a transport network, wherein the transport network is centrally controlled by a controller, wherein the transport network is configured to connect the first network domain and a second network domain, wherein the first network domain comprises the first border device, wherein the second network domain comprises a second border device, and wherein the first border transport device is connected to the first border device;
sending, by the first border transport device, the device address of the first network domain to the controller;
receiving, by the first border transport device from the controller, an identifier of a transmission pipe and a device address that is of the second network domain and that corresponds to the transmission pipe, wherein the transmission pipe connects the first border transport device and a second border transport device; and
generating, by the first border transport device, a forwarding table of the first border transport device based on the identifier of the transmission pipe and the device address that is of the second network domain and that corresponds to the transmission pipe, wherein the forwarding table of the first border transport device indicates a forwarding relationship in which service data is forwarded from the device address of the first network domain to the device address of the second network domain by using the transmission pipe.

11. The method according to claim 10, wherein the device address of the first network domain comprises at least one of an address of the first border device or a destination address of the first network domain.

12. The method according to claim 10, wherein the first border transport device communicates with the first border device based on a control protocol in at least one of a network layer or a data link layer.

13. A communications system, comprising:
- a first network domain;
- a transport network; and
- a second network domain;

wherein the transport network is centrally controlled by a controller, wherein the transport network is configured to connect the first network domain and the second network domain, wherein the transport network comprises a first border transport device and a second border transport device, wherein the first network domain comprises a first border device, the second network domain comprises a second border device, the first border transport device is connected to the first border device, and wherein the second border transport device is connected to the second border device;

wherein the controller is configured to:
- receive a device address of the first network domain from the first border transport device;
- receive a device address of the second network domain from the second border transport device;
- generate an identifier of a transmission pipe based on the device address of the first network domain and the device address of the second network domain, wherein the transmission pipe connects the first border transport device and the second border transport device; and
- send, to the first border transport device, the identifier of the transmission pipe and the device address that is of the second network domain and that corresponds to the transmission pipe, wherein the identifier of the transmission pipe and the device address that is of the second network domain and that corresponds to the transmission pipe are used to generate a forwarding table of the first border transport device, and wherein the forwarding table of the first border transport device indicates a forwarding relationship in which service data is forwarded from the device address of the first network domain to the device address of the second network domain by using the transmission pipe; and wherein the first border transport device is configured to:
- receive the device address of the first network domain from the first border device;
- send the device address of the first network domain to the controller;
- receive, from the controller, the identifier of the transmission pipe and the device address that is of the second network domain and that corresponds to the transmission pipe; and
- generate the forwarding table of the first border transport device based on the identifier of the transmission pipe and the device address that is of the second network domain and that corresponds to the transmission pipe.

14. The system according to claim 13, wherein the controller is further configured to send, to the second border transport device, the identifier of the transmission pipe and the device address that is of the first network domain and that corresponds to the transmission pipe, wherein the identifier of the transmission pipe and the device address that is of the first network domain and that corresponds to the transmission pipe are used to generate a forwarding table of the second border transport device, and wherein the forwarding table of the second border transport device indicates a forwarding relationship in which service data is forwarded from the device address of the second network domain to the device address of the first network domain by using the transmission pipe.

15. The system according to claim 13, wherein the controller is further configured to:
- send, to the second border transport device, the identifier of the transmission pipe and the device address that is of the first network domain and that corresponds to the transmission pipe, wherein the identifier of the transmission pipe and the device address that is of the first network domain and that corresponds to the transmission pipe are used to generate a forwarding table of the second border transport device, and wherein the forwarding table of the second border transport device indicates a forwarding relationship in which service data is forwarded from the device address of the second network domain to the device address of the first network domain using the transmission pipe.

16. The system according to claim 13, wherein the device address of the first network domain comprises at least one of an address of the first border device or a destination address of the first network domain.

17. The system according to claim 13, wherein the device address of the second network domain comprises at least one of an address of the second border device or a destination address of the second network domain.

18. The system according to claim 13 wherein the controller is further configured to communicate with the first border transport device based on a control plane protocol message.

19. The system according to claim 13, wherein the controller is further configured to communicate with the second border transport device based on a control plane protocol message.

20. The system according to claim 13 wherein the controller is further configured to:
- receive device addresses of second network domains from a plurality of second border transport devices in the transport network; and
- send, to the first border transport device based on a same control plane protocol message, the device addresses and an identifier of a transmission pipe corresponding to a device address, of the device addresses, of each second network domain of the second network domains.

* * * * *